(12) United States Patent
Hussain

(10) Patent No.: US 10,329,006 B2
(45) Date of Patent: Jun. 25, 2019

(54) AIRCRAFT EXTERNAL VIEWING SYSTEM, APPARATUS, AND METHOD

(71) Applicant: Shakil Hussain, Lynnwood, WA (US)

(72) Inventor: Shakil Hussain, Lynnwood, WA (US)

(*) Notice: Subject to any disclaimer, the term of this patent is extended or adjusted under 35 U.S.C. 154(b) by 0 days.

(21) Appl. No.: 16/228,759

(22) Filed: Dec. 21, 2018

(65) Prior Publication Data
US 2019/0118927 A1 Apr. 25, 2019

Related U.S. Application Data

(63) Continuation of application No. 15/098,202, filed on Apr. 13, 2016.

(60) Provisional application No. 62/147,428, filed on Apr. 14, 2015.

(51) Int. Cl.
*B64D 11/00* (2006.01)
*B64C 1/14* (2006.01)
*B64D 11/06* (2006.01)

(52) U.S. Cl.
CPC ............ *B64C 1/1476* (2013.01); *B64D 11/00* (2013.01); *B64D 11/0601* (2014.12); *B64D 2011/0069* (2013.01); *Y02T 50/46* (2013.01)

(58) Field of Classification Search
CPC ... B64C 1/1476; B64D 11/00; B64D 11/0601; B64D 2011/0069; Y02T 50/46
See application file for complete search history.

(56) References Cited

U.S. PATENT DOCUMENTS

| | | | | |
|---|---|---|---|---|
| 2,086,002 A * | 7/1937 | Shepard | .................... | B66B 9/00 114/65 R |
| 3,079,112 A * | 2/1963 | Cochrane | .............. | B64C 1/1476 244/122 R |
| 3,194,517 A * | 7/1965 | Morris | .................. | B64C 1/1476 244/121 |
| 3,618,881 A * | 11/1971 | Fellers | .................. | B64C 1/1476 244/121 |
| 5,085,383 A * | 2/1992 | Larkin | .................. | B64C 1/1476 244/121 |
| 6,951,319 B2 * | 10/2005 | Colich | .................. | B64C 1/1476 244/118.5 |
| 8,585,146 B1 * | 11/2013 | Giasson | .............. | B60N 2/0747 297/344.1 |
| 8,602,169 B2 * | 12/2013 | Fairchild | .................. | B64D 9/00 187/262 |
| 2005/0230542 A1 * | 10/2005 | Farnsworth | ............ | B64D 11/00 244/118.5 |

(Continued)

*Primary Examiner* — Justin M Benedik
(74) *Attorney, Agent, or Firm* — NIma Seyedali

(57) ABSTRACT

An aircraft viewing platform system and method that enables passengers to view the exterior of the aircraft while in flight includes a canopy assembly, a platform assembly supporting at least one seat, and an elevating mechanism to facilitate raising the platform into a volume of the canopy assembly extending through a fuselage cutout beyond the fuselage periphery. The system and method may include an actuating mechanism such as a jack screw or a telescoping system. The platform can have integrated rollers slide configured to roll in guide rails. The system can include a control panel that regulates the elevating mechanism motion. The control panel allows the viewer to move the platform. The platform can include a rotating pedestal to allow passengers have a 360-degree view of the aircraft exterior.

16 Claims, 22 Drawing Sheets

(56) References Cited

U.S. PATENT DOCUMENTS

2013/0025219 A1* 1/2013 Edmond ............... B64D 47/06
52/204.7

* cited by examiner

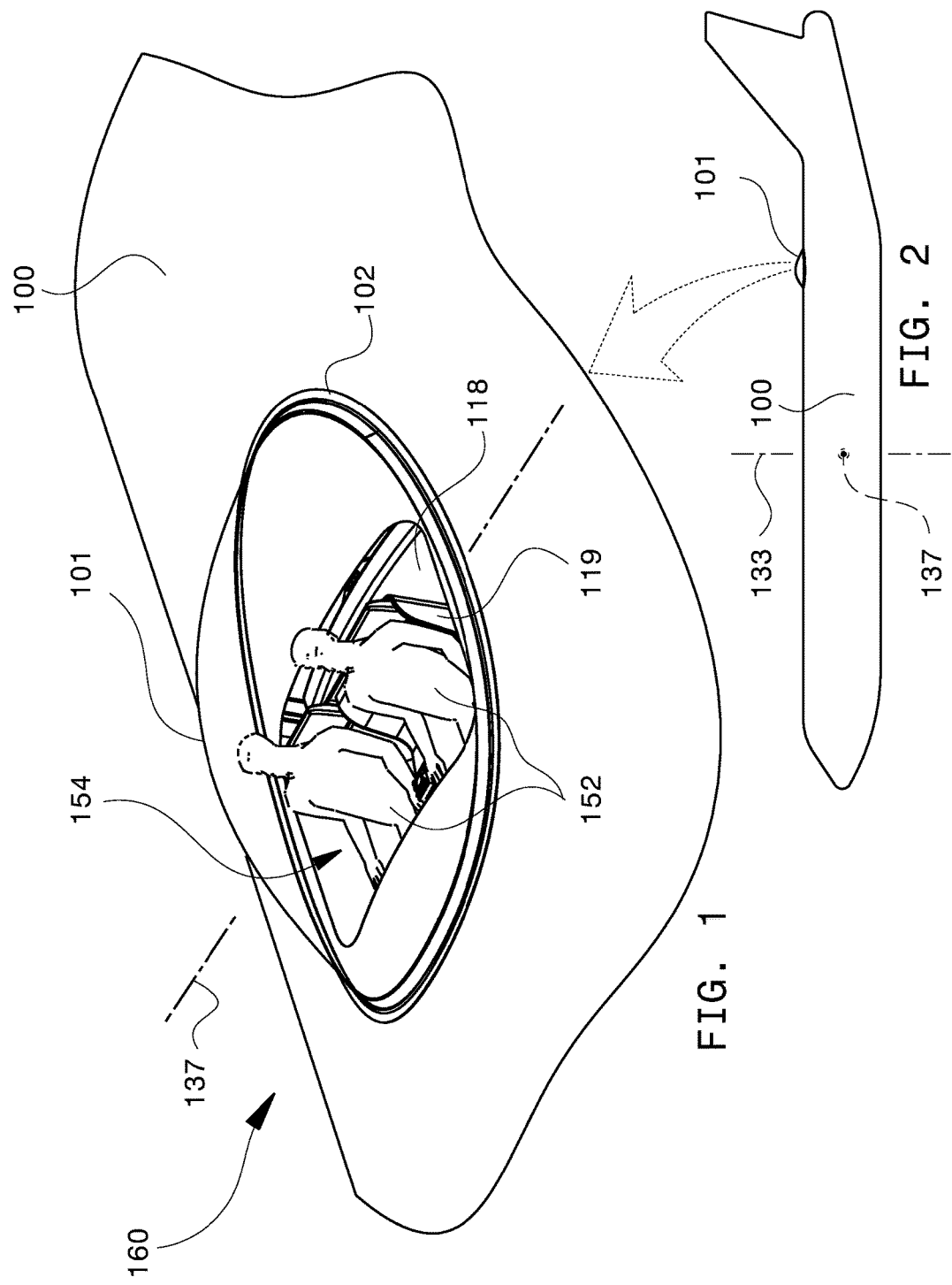

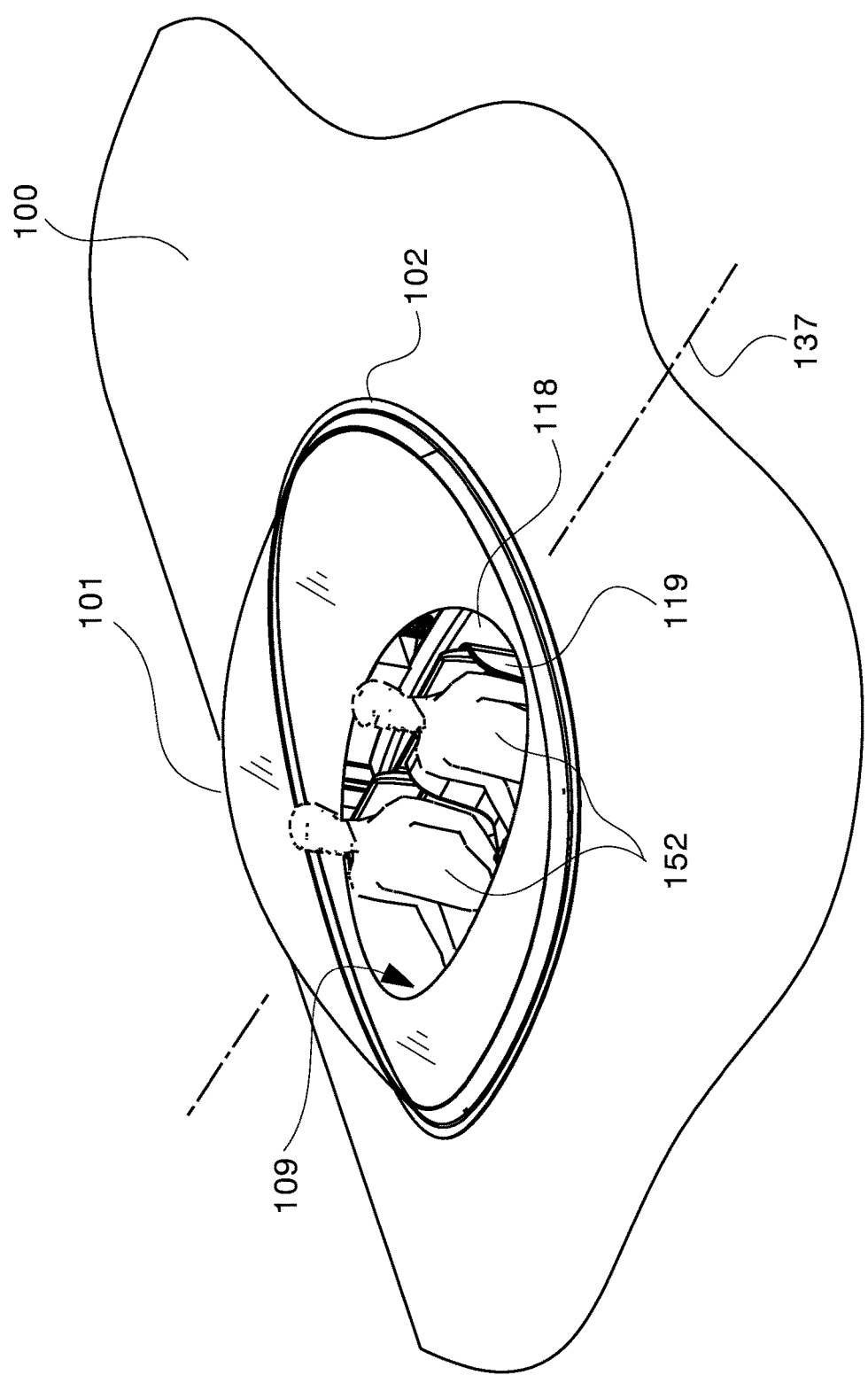

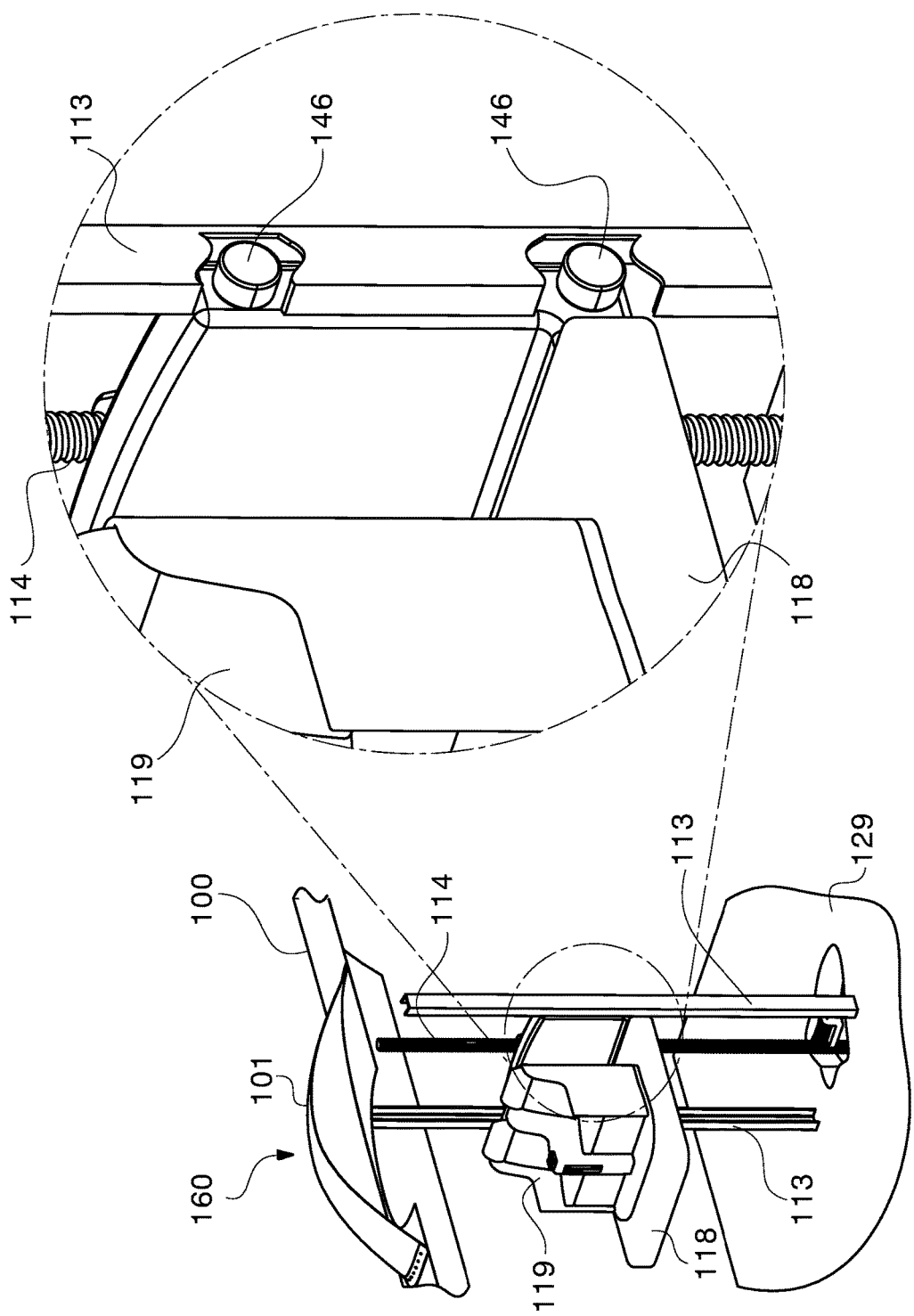

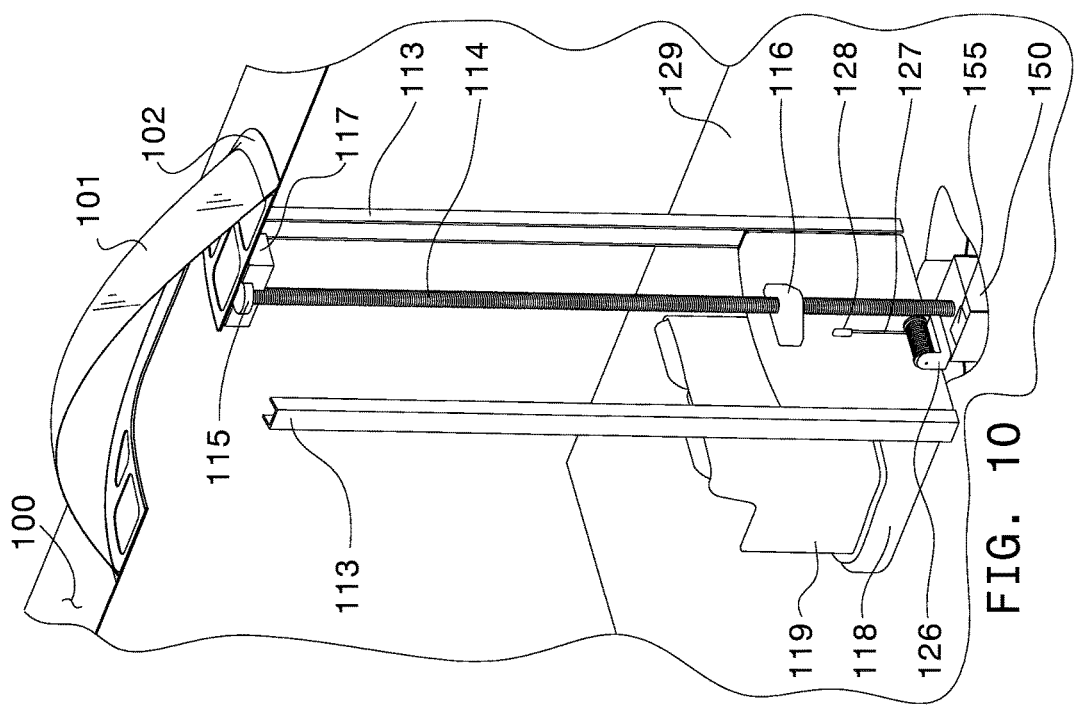
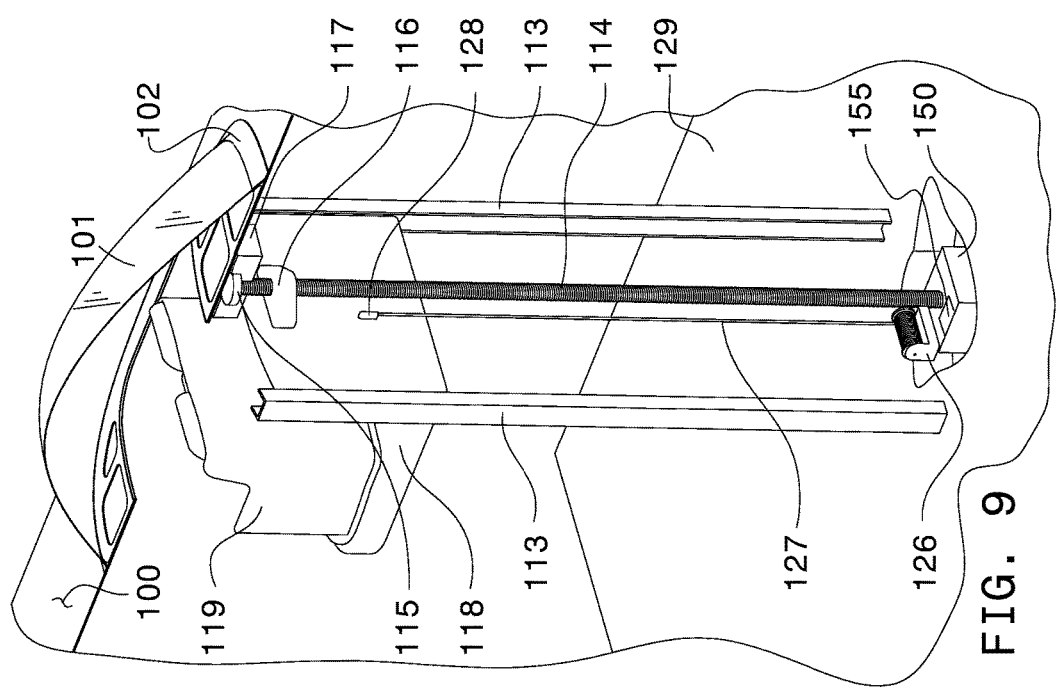

AIRCRAFT EXTERNAL VIEWING SYSTEM, APPARATUS, AND METHOD

BACKGROUND

Technical Field

The present disclosure generally relates to viewing platforms, and more particularly, to a viewing platform for a vessel adapted to facilitate viewing an environment external to the vessel from an internal environment thereof, for example an aircraft viewing platform system for passengers and method for passengers to mount or be seated on the platform and method to control the motion of the platform and a pedestal thereof.

Description of the Related Art

Transportation vessel operators and manufacturers, such as airlines and aircraft manufacturers typically search for new ways to improve the travelers' traveling or flying experience to help reduce the boredom of long duration flights. They are also in constant search of finding more creative ways to generate more revenue. Many airlines today provide on-board entertainment in the form of video in-flight entertainment (IFE) systems. On some commercial aircrafts, a video camera is installed externally, typically on the tail of the aircraft to allow the passengers to watch the external view of the aircraft from the monitor screens located at their seats. Such entertainment is however not a realistic experience of the external environment, nor is it of a quality to optimize the passenger's viewing experience. Generally, the display monitors broadcasting the external view is small and limited in resolution. Frequently, such monitors malfunction or experience technical difficulty.

Existing devices related to the design of aircraft canopies specifically relate to the canopy structure or mechanisms related to canopy operations. They include method of installing a canopy and some relate to emergency exit systems.

Such devices however lack having a system that enables passengers to view an external environment from within a vessel such as an aircraft or other vessel which during travel experiences demanding conditions, such as high speed foreign object impacts and/or an environmental differential between the interior and the exterior thereof, for example a pressure differential. For example, existing devices do not allow airline or other aircraft passengers the ability to view the external environment of the aircraft.

In addition, some prior designs relate to aircraft elevator or conveyor systems. These systems are mainly used to carry passengers, food, drinks, and/or cargo from the ground level into the aircraft. Such systems mainly operate and secure within the aircraft without providing external environment viewing during travel.

Certain other viewing platforms such as military aircraft bombers having gunner bays, which include a gun turret and a canopy, particularly relate to military type aircrafts and since these canopies have openings to allow the gun to protrude outside of canopy, they are not pressurized. Furthermore, they do not provide flexibility in viewing experience. These designs therefore cannot be used on pressurized aircraft. In addition, these systems do not include a user-friendly method of accessing the platform for the common person. This is because they were designed for military personnel who are generally assumed to be capable of climbing onto such platforms with minimal means.

BRIEF SUMMARY

According to one embodiment, a method of viewing an environment external to a fuselage of an aircraft having a floor deck and configured to fly in a cruise phase at an altitude in flight, includes mounting at least one seat adapted to seat a passenger on a platform assembly including a platform configured to mount at least one seat adapted to seat a passenger, forming a canopy volume by coupling a canopy to the fuselage, extending the canopy beyond the fuselage when coupled thereto, coupling a support structure to the fuselage and to the platform, and coupling an elevating system to the platform, configuring the elevating system to be operable to facilitate positioning the passenger between a first position located proximate the floor deck of the fuselage and a second position in which the passenger is at least partially positioned in the canopy volume.

According to one aspect, the method further includes positioning a pedestal between the platform and the seat, rotatably coupling the pedestal to the platform and fixedly coupling the pedestal to the seat.

According to one aspect, the step of coupling the elevating system includes coupling at least one jack screw column to the fuselage, and at least one gimbal system to the platform, rotatably coupling the jack screw column to the gimbal system, rotation of the jack screw column imparting axial motion to the gimbal system.

According to one aspect, the method further includes coupling at least one self-retracting electrical cable spool unit to at least one of the fuselage and the support structure, the spool unit having a spool and a cable, and coupling the cable to the spool toward one end thereof, and to the platform assembly toward an opposing end thereof.

According to one aspect, the method further includes constructing the support structure from a tower structure including a plurality of support columns and a plurality of truss members respectively having first and second ends, rotatably coupling the support columns to the fuselage toward at least one end of each support column to rotate about a first axis, and rotatably coupling the first end of the truss members to one of the support columns and rotatably coupling the second of the truss members to a support column adjacent thereto, to rotate about a second axis.

According to one aspect, the first axis is perpendicular to the second axis.

According to one aspect, the method further includes coupling a control panel to at least one of the platform assembly and the seat, and operatively coupling the control panel to the elevating system to facilitate selectable movement of the platform, and electronically coupling at least one monitor to the control panel, the monitor adapted to display information.

According to one aspect, the step of coupling the elevating system includes hingedly coupling a staircase to the support structure, and coupling a plurality of actuators and actuation levers to the staircase, the actuators moderating movement of the staircase between a retracted position and an extended position.

According to one aspect, the step of coupling the elevating mechanism includes forming a telescopic mechanism by nesting a plurality of support sections including a base support section and nesting at least one support section in an adjacent support section, and in operation actuating the plurality of support sections between a nested stowed position and a telescoping extended position in which the support sections extend from their respective nested positions.

According to another embodiment, a method of manufacturing an aircraft includes installing a floor deck in a fuselage, forming an observation opening in the fuselage, coupling a canopy assembly having a canopy to the fuselage, extending the canopy beyond the fuselage, forming a canopy volume, mounting a seat configured to seat a passenger on a platform assembly having a platform, coupling a support structure to the fuselage, coupling the support structure to the platform, and coupling an elevating system to the platform operable to facilitate positioning the seat between a first position located proximate the floor deck of the fuselage and a second position in which the passenger is at least partially positioned in the canopy volume.

According to one aspect, the coupling the elevating system includes at least one gimbal system to a jack screw column and to the platform assembly, wherein in operation, rotation of the jack screw column in the gimbal system facilitates movement of the platform assembly and seat between the upper and lower positions.

According to one aspect, the step of coupling the support structure includes coupling to the fuselage a tower structure including a plurality of support columns and a plurality of truss members respectively having first and second ends, rotatably coupling the tower structure to the fuselage toward at least one end of each support column, and rotatably coupling the first end of the truss members to one of the support columns and rotatably coupling the second end of the truss members to another one of the support columns.

According to one aspect, the coupling of the at least one end of each support column includes rotatably coupling the at least one end to rotate about a first axis, and rotatably coupling the first and second ends of the truss members includes rotatable coupling about a second axis perpendicular to the first axis.

According to one aspect, the method further includes positioning a control panel with respect to the seat to allow the passenger in the seat to manipulate the control panel, electronically and operatively coupling the control panel to the elevating system, and operatively coupling to the control panel, a display monitor viewable from the seat and configured to display information.

According to one aspect, coupling the elevating system includes pivotably coupling a staircase assembly to the platform assembly, and coupling at least one actuator to the staircase assembly and the platform, configuring the actuator to dampen motion of the staircase between a first lowered position and a second stowed position.

According to yet another embodiment, an aircraft observation system adapted to be installed to a fuselage of an aircraft, includes a canopy extending beyond the fuselage and forming a canopy volume; an adaptor plate coupling the canopy to the fuselage, the adaptor plate having an outer flange with a pair of legs forming an obtuse angle, and an inner flange having a pair of legs forming an acute angle, a support structure pivotably coupled to the fuselage toward at least one end thereof to rotate about at least one axis, a platform assembly having a platform and at least one seat rotatably coupled to the platform and adapted to seat a passenger, and an elevating system coupled to the support structure and to the platform assembly, the elevating system configured to facilitate positioning the passenger between a first position located proximate the floor deck of the fuselage and a second position in which the passenger is at least partially positioned in the canopy volume.

BRIEF DESCRIPTION OF THE SEVERAL VIEWS OF THE DRAWINGS

FIG. 1 is an isometric view of a portion of an aircraft fuselage including an observation or viewing system having a canopy, a viewing platform, and a fuselage cut-out according to one embodiment, and an example of an orientation of passengers seated on the platform.

FIG. 2 is a scaled side view of an aircraft showing a possible location of a canopy and a viewing platform according to one embodiment.

FIG. 3 is an isometric view of a portion of an aircraft fuselage including an observation or viewing system having a canopy, a viewing platform, and a generally circular or elliptical fuselage cut-out according to one embodiment, and an example of an orientation of passengers seated on the platform.

FIG. 8A is an isometric view of the elevating platform of FIG. 7 according to one embodiment.

FIG. 8B is an isometric close up view of a portion of FIG. 8A with a portion of the support structure removed for clarity of illustration, revealing 5 platform rollers coupled to the guide rails, according to one embodiment.

FIG. 9 is a rear isometric view of the elevating platform of FIG. 8A with the elevating platform shown in a first upper position.

FIG. 10 is a rear isometric view of the elevating platform of FIG. 8A with the elevating platform shown in a second lower position.

DETAILED DESCRIPTION

Figure 4:
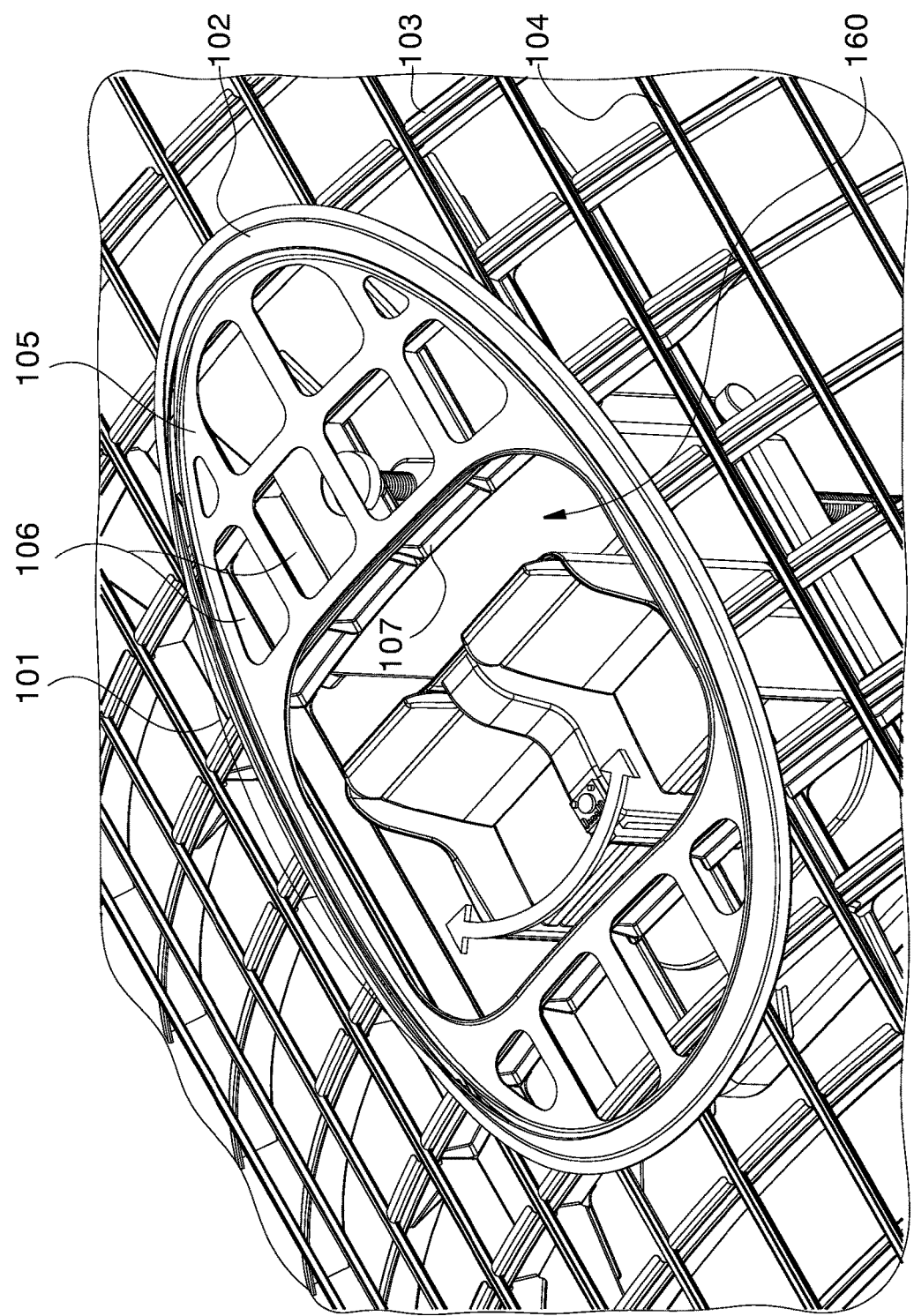
FIG. 4 is an isometric view of the portion of the aircraft fuselage of FIG. 1 with the fuselage skin removed for clarity of illustration, revealing a machined reinforcement plate of the observation system, fuselage frames, fuselage frame reinforcements, fuselage cut-out, stringers, according to one embodiment.

Throughout this disclosure various access and aircraft modifications are described to provide a thorough understanding of certain embodiments. It is understood however that other embodiments may include varying combinations of the described and not described access and aircraft modification features suitable to accommodate canopies and platforms facilitating passenger viewing of an environment external with respect to the aircraft or other vessel, especially vessels experiencing demanding loads and conditions. All such variations are contemplated to be within the scope of the present disclosure.

For example, some of the loading conditions aimed to be managed by observation systems according to various embodiments can include flight or travel loads, pressure loads, aerodynamic loads, and bird strike loads in accordance to the requirements of the Aviation Authorities and/or authorities governing other vessels such as high-speed trains, submarines, helicopters, and/or other water, ground, and/or aircrafts or vessels.

FIG. 1 illustrates a portion of an aircraft fuselage 100 including an observation system 160 according to one embodiment. In one aspect, the observation system 160 can be coupled to a framed cutout in the aircraft fuselage 100. As illustrated in FIG. 1, according to one aspect, the observation system 160 includes a canopy 101 and a platform 118. In an aspect, the canopy extends beyond the fuselage 100 forming a canopy volume therein. In one embodiment, the platform 118 is configured to safely and comfortably seat at least one passenger 152. In one aspect, the observation deck is configured to house the passenger(s) 152 in the aircraft pressurized environment to enable the passenger(s) 152 to enjoy the external view of the aircraft while the aircraft is in flight.

While this figure shows an example of a two-passenger observation system, other embodiments and/or systems can be scaled up or down to accommodate one passenger or any number of passenger(s) without departing from the scope and spirit of the present disclosure.

FIG. 2 illustrates at least one possible location of the canopy 101 relative to the aircraft fuselage structure 100, according to one embodiment. The aircraft includes a vertical or yaw axis 133 and a lateral or pitch axis 137. Other suitable aircraft locations to install or mount an observation deck according to an embodiment of this disclosure are contemplated to fall within the scope of the present disclosure. Locating the system 160 aft or rear with respect to the aircraft wings has the additional advantage of either mitigating any adverse aerodynamic impacts of the canopy 101 or even improving it.

In the illustrated embodiment of FIG. 1, the fuselage can include a cutout 154. In one aspect, the cutout 154 allows for passengers 152 to view the external environment. The cutout 154 can include any suitable shape or outline, for example, in the illustrated embodiment of FIG. 1, the cutout 154 has a generally rectangular shape with curved corners. Other shapes and features are possible and within the scope of this disclosure.

In the illustrated embodiment of FIG. 3, for example, the fuselage 100 includes an opening or cutout 109, which can in one aspect have a generally circular shape or outline. In other embodiments, the fuselage cutout 109 can also come in many other shapes including an elliptical or other curvilinear shape or any other suitable shape.

Referring to FIG. 4, the observation system 160 can include a reinforcing element or adaptor plate 105. Without any intention to limit the scope of the present disclosure, and for purposes of brevity, the reinforcing element or adaptor plate 105 will be referred to as reinforcing element 105. It is understood that in various embodiments, the reinforcing element 105 can include a reinforcing member or an adaptor plate to adapt and/or couple the canopy to the aircraft fuselage 100 structure. According to one aspect, the reinforcing element 105 can include a machined reinforcement plate. In one embodiment, the reinforcing element 105 is coupled to one or more members making up the aircraft fuselage 100 structure, such as frames 103, stringers 104, and/or intercostals 106 of the fuselage 100. In one aspect, the canopy 101 includes or is coupled to an outer flange 102 positioned toward an end of the canopy 101 and extending therefrom relative to the canopy 101. In one aspect the outer flange 102 is configured to be positioned adjacent or contiguous to the reinforcing element 105.

Figure 5:
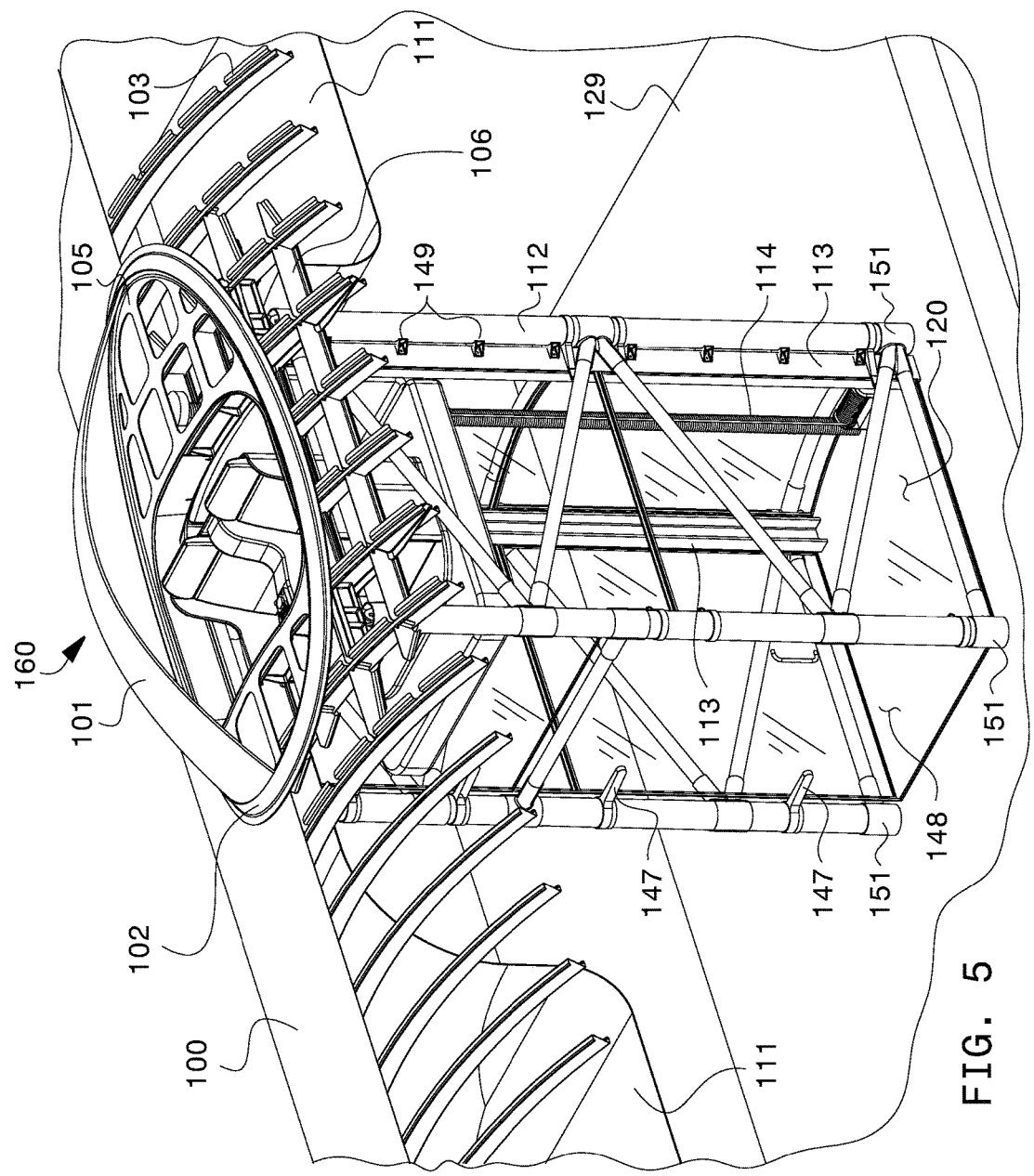
FIG. 5 is a front isometric cutaway view of an elevating platform system of an observation deck including a support structure, an enclosure, guide rails, and an actuating column located relative to a main deck of the fuselage, according to one embodiment.
Figure 6A:
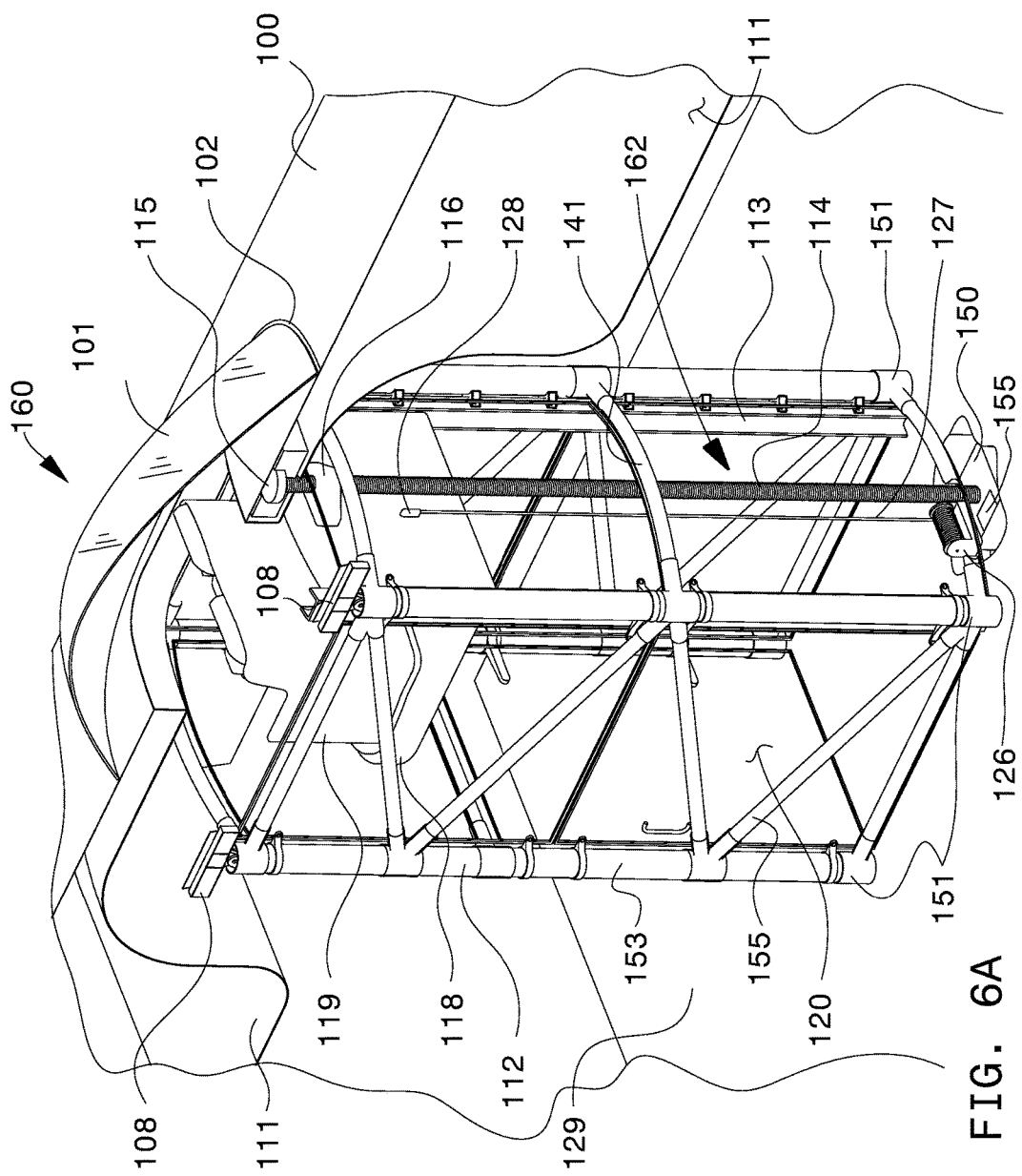
FIG. 6A is a rear isometric cutaway view of the elevating platform of FIG. 5, illustrating the support structure, a spool, cable system, and actuating motor and lower support thereof, according to one embodiment.

As illustrated in FIGS. 5 and 6A, in one embodiment, the observation system 160 includes a support tower structure 112 having a frame including a plurality of support columns 153. The tower structure 112 can in one embodiment include a plurality of truss members 139 coupling each support column 153 to the closest or adjacent support column 153, along at least part of the periphery of the tower structure 112. In one aspect, the truss members coupling two support columns 153 extend at an angle, for example an acute angle with respect to each other.

In one embodiment, the observation system 160 includes fixed guide rails 113, which can be fixed in one aspect relative to the main deck 129 and the fuselage 100. The guide rails 113 can be secured in any suitable manner. In the illustrated embodiment of FIG. 5 for example, the tower structure includes coupling elements 149, such as brackets, which are configured to couple or attach the guide rails 113 to the support tower structure 112. In some embodiments, the coupling elements 149 can be flexible or include elongated holes for attaching fasteners to accommodate deflections imposed by aircraft fuselage 100 structure on the tower structure 112 and/or guide rails 113.

In one embodiment, the observation system includes an enclosure 120, which can be fabricated from a transparent material in one embodiment. According to one embodiment, the enclosure 120 can include a door 148 hingedly or pivotably connected or coupled to, or with respect to, the tower structure 112. For example, in one aspect, the door 148 can be hingedly coupled to the tower structure 112 via at least one, or a plurality of, hinge elements 147.

In one embodiment, as illustrated in FIG. 6A, the observation system 160 includes a motion or elevating system or assembly 162. In one aspect, the motion assembly 162 can include a jackscrew column 114, gimbal assembly 116, self-retracting electrical spool 126 and cable 127, such as an electrical cable for delivering power to any portion of the system 160, such as the motion assembly 162. The spool 126 can in one aspect be self-retracting via any suitable mechanism such as a biasing or spring mechanism, electrical mechanism, mechanical or winding mechanism, or the like.

The motion assembly 162 can be operatively coupled with respect to the fixed support tower structure 112. In one embodiment, the motion assembly 162 can include a jackscrew motor 155 and a lower support 150 configured to be positioned below the main deck 129 of the fuselage 100. In one embodiment, the fixed support tower structure 112 includes an upper end coupled to the fuselage 100 via coupling members 108, for example, via machined intercostals 108 and a lower end 151 coupled to the main deck 129 structure.

In some aspects, the support tower structure 112 can include one or more lateral truss members 141, which can be curvilinear to extend about the jackscrew column 114 as illustrated in FIG. 6A. In one embodiment, any one of the truss members 155 and/or the lateral truss members 141 can be pivotably coupled to the corresponding support columns 153. In addition, or instead, the support columns 153 can be pivotably coupled to the fuselage structure 100 toward at least one end of the support columns 153. An example of an upper end of the support columns 153 pivotably coupled to the fuselage is provided further below.

Other suitable pivotable, hinged, or rotatable connections are contemplated to be within the scope of the present disclosure. The pivotable coupling of the truss members 141, 155 to the support columns 153 and/or that of the support columns 153 to the fuselage structure 100, allows for the tower structure 112 absorbing and adapting to any fuselage 100 deflections during flight while supporting the motion assembly 162. In some embodiments, the support columns 153 are coupled toward at least one end thereof to the fuselage 100 to rotate about an axis parallel to the pitch axis 137 (FIG. 2) of the fuselage 100, and the truss members 155 have first and second ends, which are coupled to the support columns 153 to rotate about an axis parallel to the yaw axis 133 (FIG. 2) of the fuselage 100. Such pivotable or rotatable coupling facilitates absorbing, adapting to, and/or accommodating the fuselage 100 deflections without introducing a hard point on the fuselage and without adversely impacting the observation system 160 support attributes. This makes application of incorporating the canopy 101 in a pressurized environment.

Figure 6B:
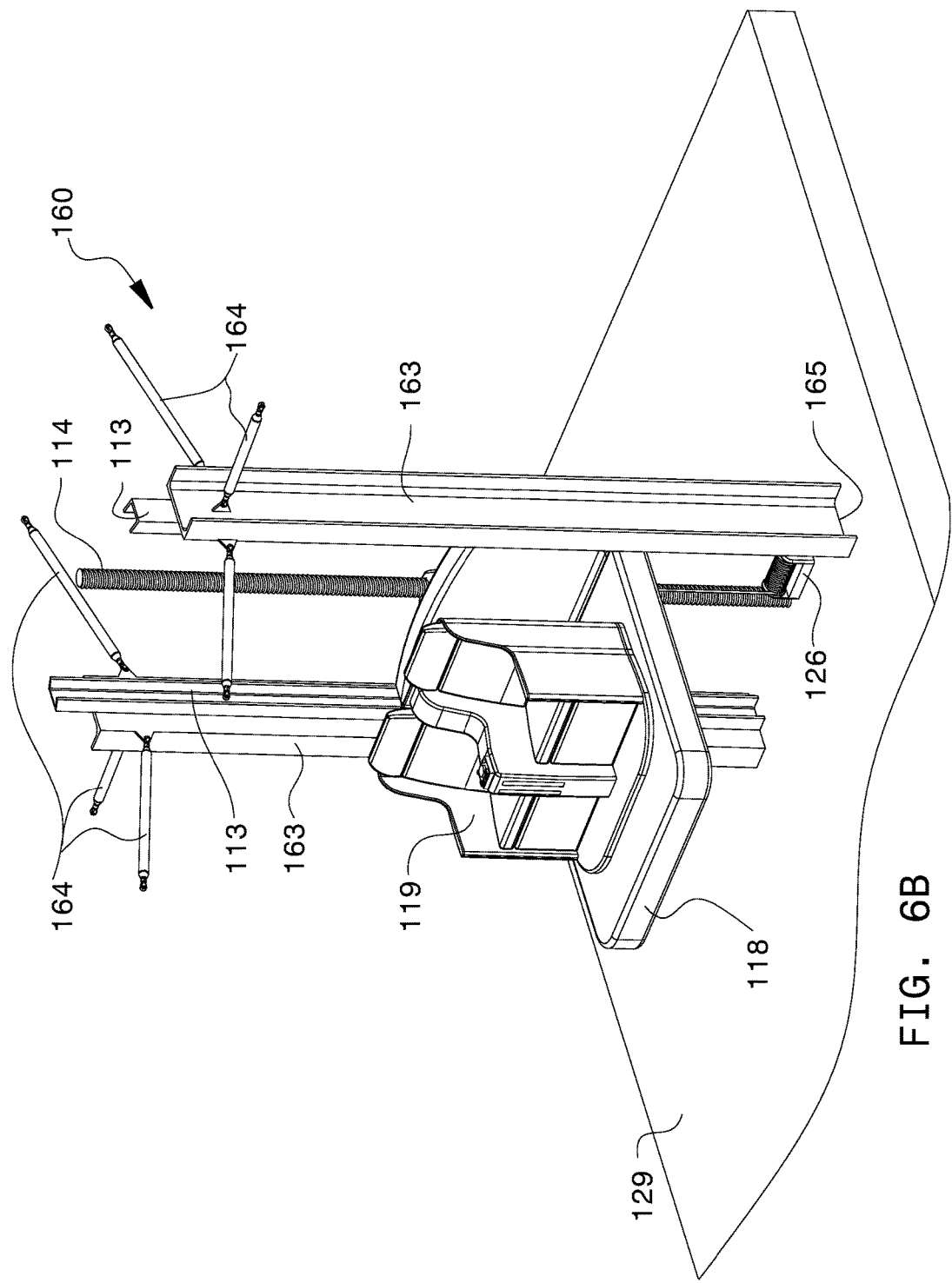
FIG. 6B is a front isometric cutaway view of an elevating platform, illustrating guide rails configured to be coupled to support columns configured to be coupled to the fuselage according to another embodiment.

It is understood that various embodiments may include various features for supporting the guide rails 113 and/or the viewing platform 118, without departing from the scope of the present disclosure. For example, FIG. 6B illustrates another embodiment, in which the guide rails 113 are mounted and/or coupled to at least one support column structure 163. In one aspect, the support column(s) 163 can be attached toward an upper end thereof, to the aircraft fuselage 100 structure via any suitable coupling elements 164, such as for example one or a plurality of tie rods. According to one embodiment, the tie rods 164 can be rotatably coupled to the support column(s) 163 and to the fuselage 100 structure, respectively. For example, they can be coupled to the support column(s) 163 to rotate about at least one axis, and to the fuselage 100 to rotate about at least one axis. For rotation about one axis the tie rods 164 can be coupled in a manner such as a bracket and pin combination, or more than one axis via a ball and socket connection, or the like.

For example, in one embodiment, the observation system 160 can include a support structure comprising of at least one support column 163 and guide rails 113 which can be substantially fixed in one aspect relative to the main deck 129 and the fuselage 100, except for the flexibility facilitated by the tie rods 164. In one embodiment, the upper end of the support columns 163 can be supported by the aircraft fuselage structure 100 using tie rods 164 without creating a stiff hard point, thereby mitigating chances of structure premature and/or fatigue crack generation. In one aspect, the lower ends 165 of the support column(s) 163 can be attached to the main deck 129 of the fuselage 100.

Figure 7:
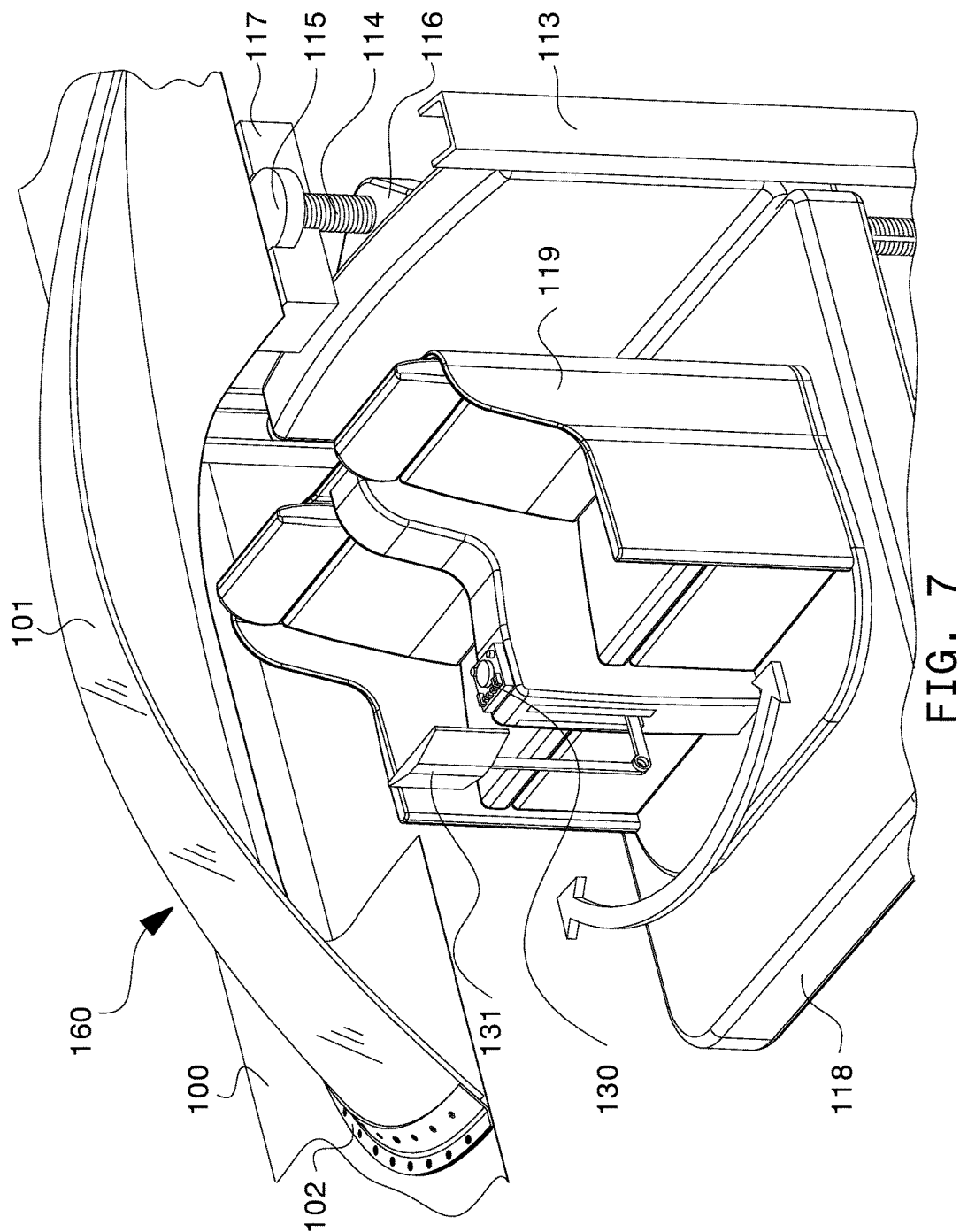
FIG. 7 is an isometric cutaway view of a portion of the platform of FIG. 5, including guide rails, actuating column, gimbal system, jack screw upper bearing support structure, and seats having an integrated control panel and a monitor, according to one embodiment, where the monitor can be stowable and/or flat screen in certain embodiments.

FIG. 7 illustrates the viewing platform 118 mounting passenger seats 119 according to one embodiment. In one embodiment, the observation system 160 includes a control panel 130 coupled to, or positioned in proximity, to the seats 119. For example, in one embodiment, the control panel 130 can be movably or adjustably coupled with respect to the seats 119. In some embodiments, the control panel 130 is directly coupled to the seats 119, and in other embodiments, the control panel 130 is indirectly coupled to the seats 119. In some embodiments, the control panel 130 is positioned to be viewed and manipulated by a user in the seats 119, whether or not it is coupled to the seats 119.

Figure 14:
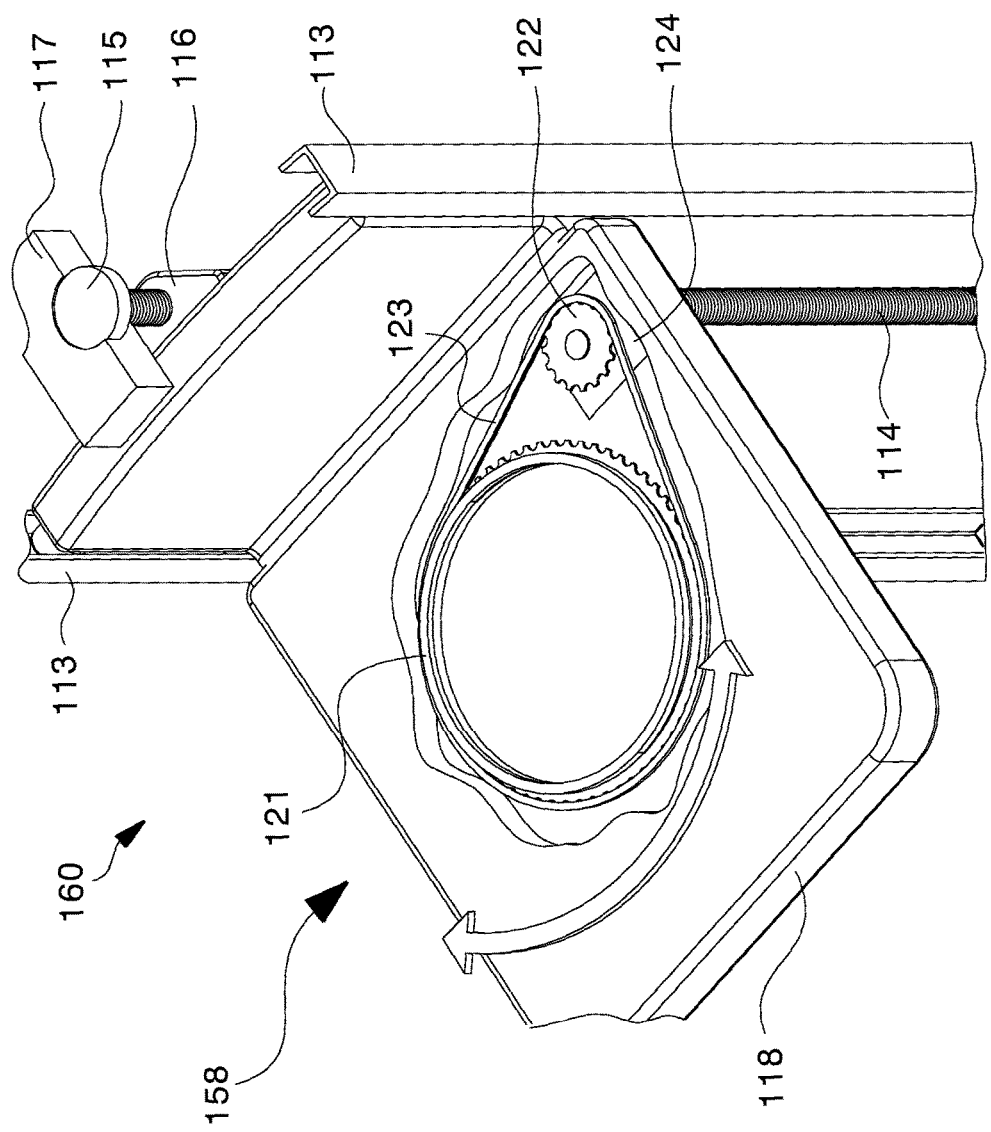
FIG. 14 is an isometric view of the elevating platform of FIG. 13 with a portion thereof cut away, revealing a mechanism for the rotating pedestal including a geared ring coupled to a gear via a geared belt, the gear configured to be operatively coupled to a motor or actuating mechanism, according to one embodiment.

In one aspect, the control panel 130 can be operatively and/or electronically coupled to and/or in communication with the motor 155 (FIG. 6A) to allow the passengers to operate the motion of the viewing platform 118. The control panel 130 in one embodiment is in electronic communication with at least the jackscrew motor 155 shown in FIG. 6A, FIG. 9, and FIG. 10, to control the motion of the viewing platform 118, for example substantially vertical motion thereof along the fuselage 100 vertical or yaw axis 133 (FIG. 1). In some embodiments, as illustrated in FIG. 14, the observation system 160 can include a pedestal actuation device 124, such as a pedestal motor, configured to impart radial motion to the viewing platform 118. FIG. 14 is discussed later in more detail in this disclosure. In one embodiment, the control panel 130 (FIG. 7) can be coupled to the pedestal motor 124 (FIG. 14) to allow the passengers to control the rotation of the viewing platform 118 for viewing purposes.

In one aspect, the system 160 can include at least one monitor 131 in electronic communication with the control panel 130 and with one or more of the aircraft's information systems such as in flight entertainment systems, satellite information systems, the Internet, aircraft global positioning systems, aircraft external viewing systems, aircraft map systems, any combination thereof, and/or any other suitable source of information.

In such an embodiment, the passengers 152 (FIG. 1) can view information on the monitor 131, such as, but not limited to, flight information and path, aircraft location, direction the passengers 152 are facing, description of stars viewed by the passengers 152, location and/or cities the aircraft is flying over at the time the passengers 152 are viewing the external environment, and the like. As illustrated in FIG. 8A and FIG. 8B, the observation system 160 can in one embodiment include one or more platform rollers 146 coupled to the viewing platform 118, for example, rotatably coupled thereto. The platform rollers 146 in one aspect can provide structural support to the viewing platform 118. In one aspect, the platform rollers 146 can be rotatably coupled to, or with respect to, the fixed guide rails 113, and can allow the viewing platform 118 to safely move, for example, in the vertical direction parallel to the fuselage 100 yaw axis 133 (FIG. 1), by operating or rolling in or on the fixed guide rails 113.

In one aspect, the electrical cable 127 and spool 126 can be used to power the pedestal motor 124, the control panel 130, the jackscrew motor 155, and/or the monitor 131.

FIG. 9 illustrates the viewing platform 118 in a first upper most position with the electrical cable 127 in the extended position, according to one embodiment. In one aspect, the cable 127 can be secured via a securing or coupling device toward one end thereof at a securing location 128. In one embodiment, the jackscrew 114 includes or is coupled to a first upper bearing support 115 and support structure 117 configured to be coupled to the fuselage 100. For example, in one aspect, the first upper bearing support 115 can be rotatably coupled to the support structure 117. In one embodiment, the gimbal assembly 116 can be coupled to the viewing platform 118 or a portion thereof.

FIG. 10 illustrates the viewing platform 118 in a second lower position with the electrical cable 127 in a retracted position, according to one embodiment. In operation according to one embodiment, when the motor 155 is actuated, it rotates the jackscrew column 114, which in turn imparts substantially linear motion to the gimbal assembly 116, moving the viewing platform 118 between the first and second positions respectively illustrated in FIGS. 9 and 10 in a vertical direction parallel to the yaw axis 133 (FIG. 1).

Figure 11:
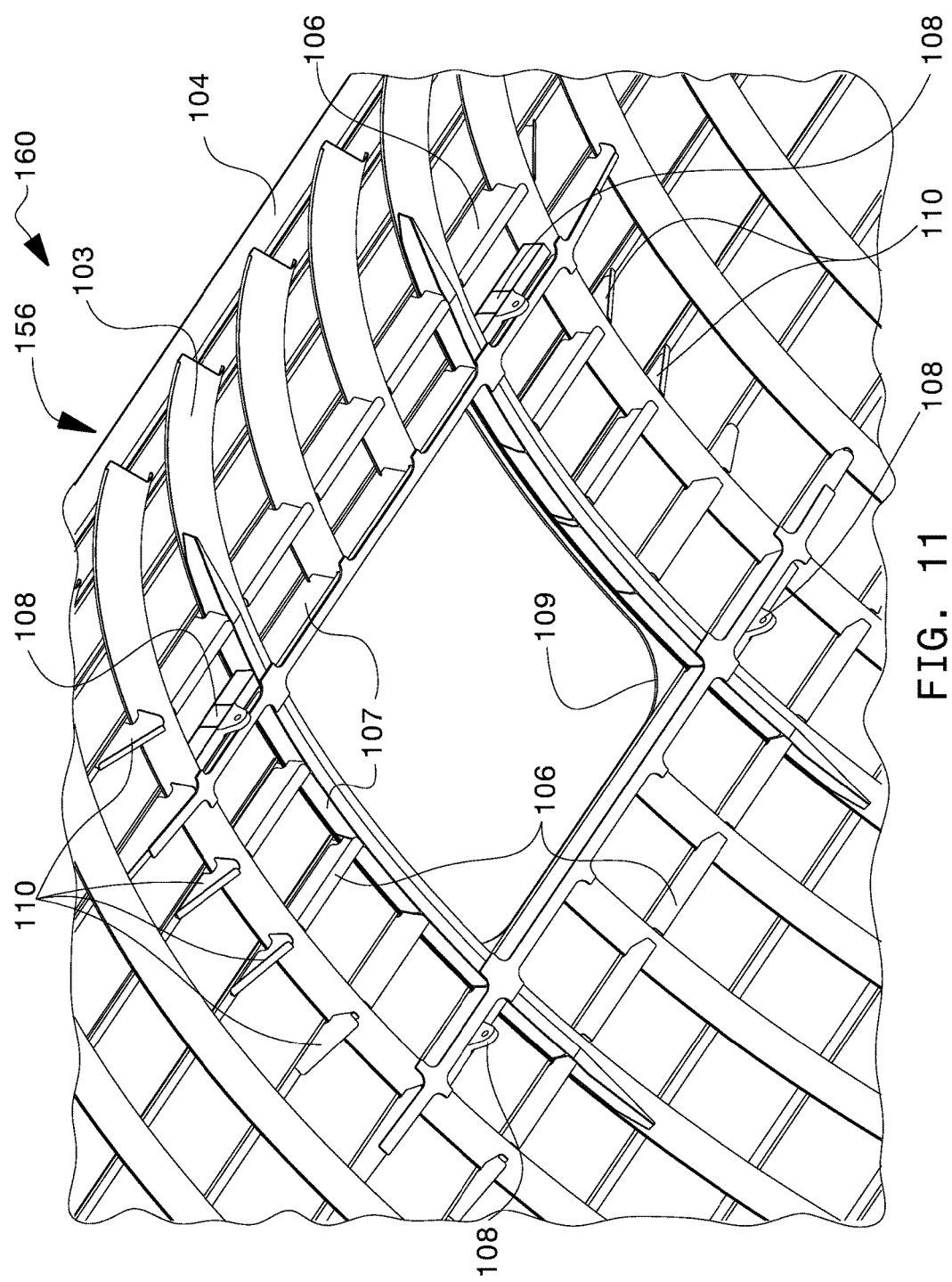
FIG. 11 is an isometric view of fuselage frames and an opening for the observation deck of FIG. 5, illustrating reinforcement frames and intercostals including intercostals having integrated lugs to support the fixed support structure.

As illustrated in FIG. 11, the observation system 160 in one embodiment may include a reinforcement method and/or device, system, or assembly 156 for strengthening the fuselage cutout 109. For example, in one aspect, the reinforcement system 156 can include one or more reinforcement frames 107 and/or one or more intercostals 106, according one embodiment.

In one aspect, the intercostals 106 can be fabricated from a unitary body of material that tapers toward the ends thereof, or in another embodiment, the intercostals 106 can be coupled toward the ends thereof, to reinforcement brackets 110, which in turn taper. The tapering reinforcement brackets 110, or intercostal 106 ends, as the case may be, are configured to transfer the end loads of the intercostals 106 into the fuselage 100 structure, such as into the stringers 104 and fuselage structure 100, without creating a stiff hard point, thereby mitigating chances of structure premature crack generation.

Figure 12:
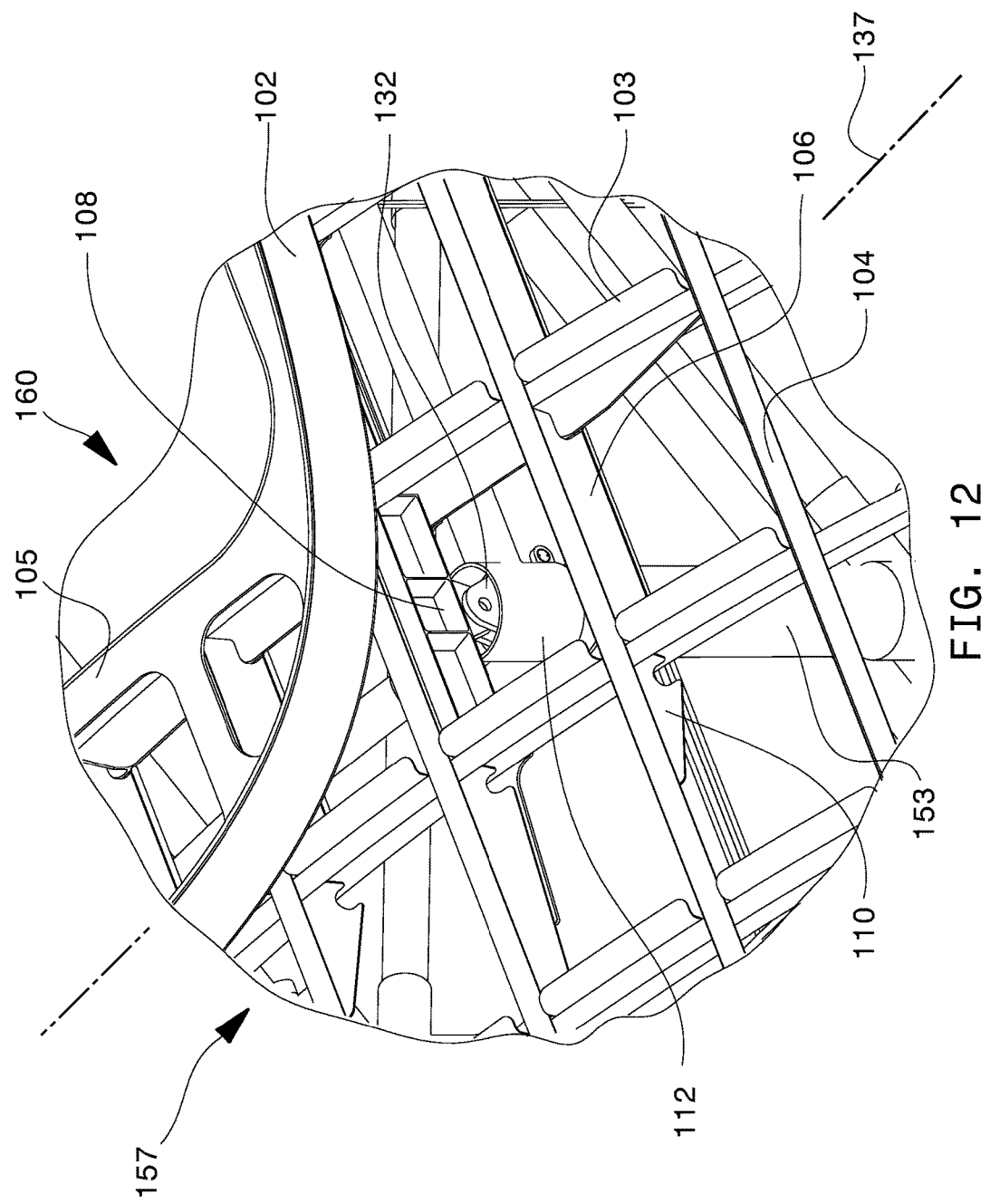
FIG. 12 is an isometric view of the support structure of FIG. 5, illustrating coupling of the support structure toward an upper end thereof, to an intercostal, according to one embodiment.

According to one embodiment, the reinforcement system 156 may include a plurality of cutout surround intercostal members 108. For example, in one aspect, the plurality of cutout surround intercostal members 108 can include one or more, or in one embodiment, four, machined intercostals with integrated lugs coupled thereto. In one aspect, the cutout surround intercostal members 108 can be coupled to the fixed support tower structure 112 as shown in FIG. 12. In one aspect, the integrated lugs are coupled to the fixed support tower structure 112.

In some embodiments, as illustrated in FIG. 12, the observation system 160 may include a mounting method and/or apparatus or system 157 for mounting the fixed support tower structure 112 to the aircraft fuselage 100. For example, in one embodiment, the mounting system 157 can include one or more machined intercostals 108 having integrated lugs or having lugs coupled thereto. In one embodiment, the support tower structure 112, or the support columns 153, can include one or more clevises 132, and the lugs of intercostals 108 can in one aspect mate with or be coupled to the clevises 132 of the fixed support tower structure 112 to allow rotation of the support columns 153, for example in a direction parallel to the pitch axis 137 (FIG. 2), for absorbing, adapting to, or accommodating fuselage 100 deflections. In one embodiment, the aforementioned lugs and clevises 132 can be coupled together by at least one fastener, such as a bolt.

In another embodiment, the lug of intercostals 108 can include elongated holes to allow the at least one fastener to freely travel in the vertical direction to accommodate expansion and contraction of the fuselage 100 and avoid the creation of a stiff hard point, thereby mitigating chances of structure premature and/or fatigue crack generation.

Figure 13:
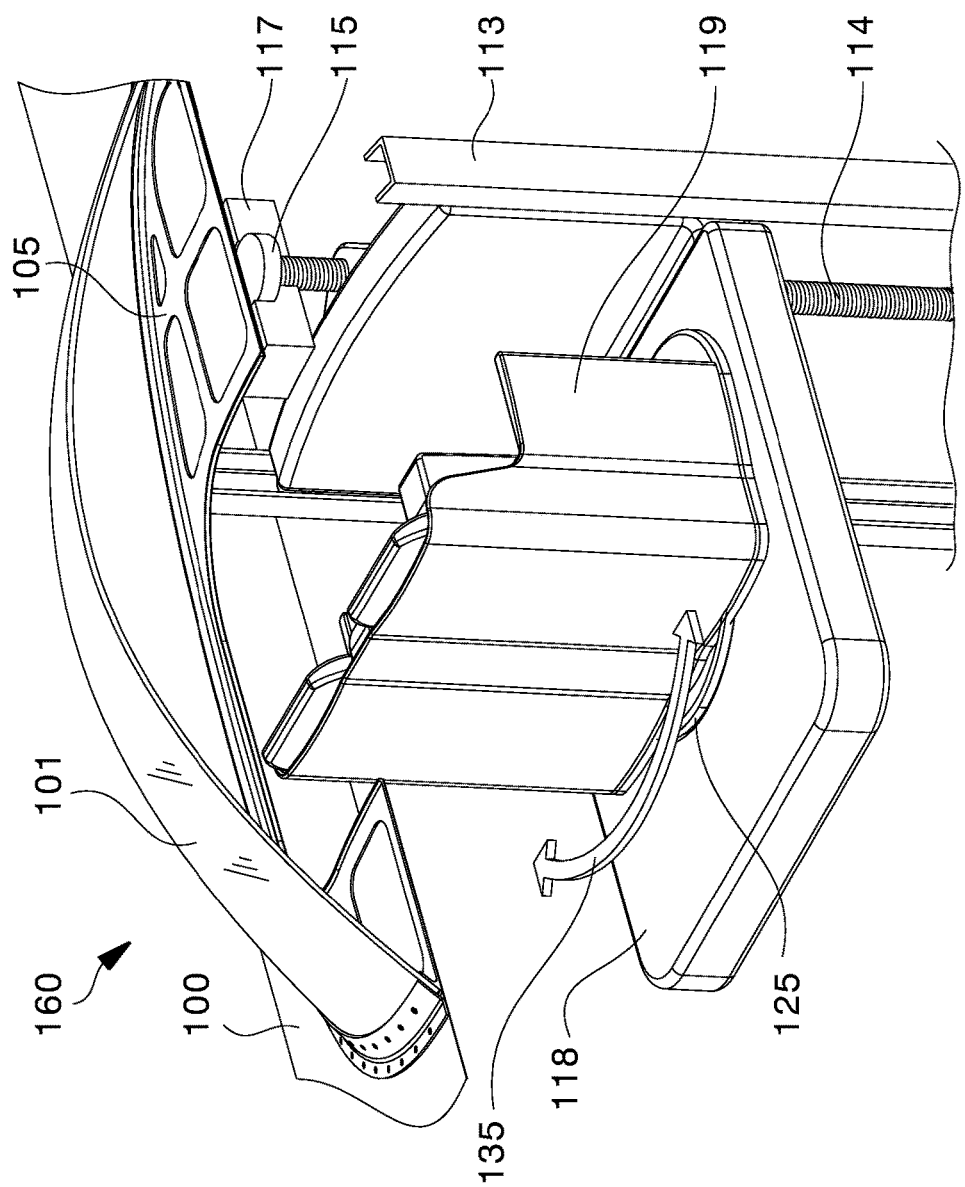
FIG. 13 is an isometric view of an elevating platform of an observation system, the platform having a rotating pedestal configured to mount seats, with the pedestal shown in a first rear position, according to one embodiment.

In some embodiments, as illustrated in FIG. 13, the observation system 160 can be configured or include features or components that facilitate rotation of the seats 119 and/or of the viewing platform 118 in a radial direction 135 about an axis parallel to the yaw axis 133 (FIG. 1). For example, FIG. 13 illustrates a method and/or device or apparatus for enabling the seats 119 to rotate, the seats 119 configured to be mounted on, and/or to, such device and/or apparatus. For example, according to one aspect, the observation system 160 can include a rotating pedestal 125, the seats 119 being coupled to, or mounting on, the rotating pedestal 125.

In one embodiment as illustrated in FIG. 14, one method or apparatus for rotating the seats 119 (FIG. 13) can include a rotating mechanism 158 to allow the pedestal 125 (FIG. 13) to rotate. In one embodiment, the rotating mechanism 158 can include a first pedestal gear 121 configured to mount, or be coupled to, the pedestal 125, the first pedestal gear 121 being adapted to rotate with respect to the viewing platform 118 (FIG. 13). In one aspect, the rotating mechanism 158 can include a second pedestal gear 122 operatively coupled to the first pedestal gear 121. In one aspect, the rotating mechanism 158 can include a pedestal motor 124 and a belt element 123, for example, a geared belt member. In one embodiment, the belt element 123 can operatively couple the first and second gears 121, 122. In one aspect, the first gear 121 can be larger than the second gear 122. In one aspect, the second gear 122 can be operatively coupled to the motor 124 to rotate, and in turn impart rotation to the first gear 121 via the belt element 123.

Figure 15:
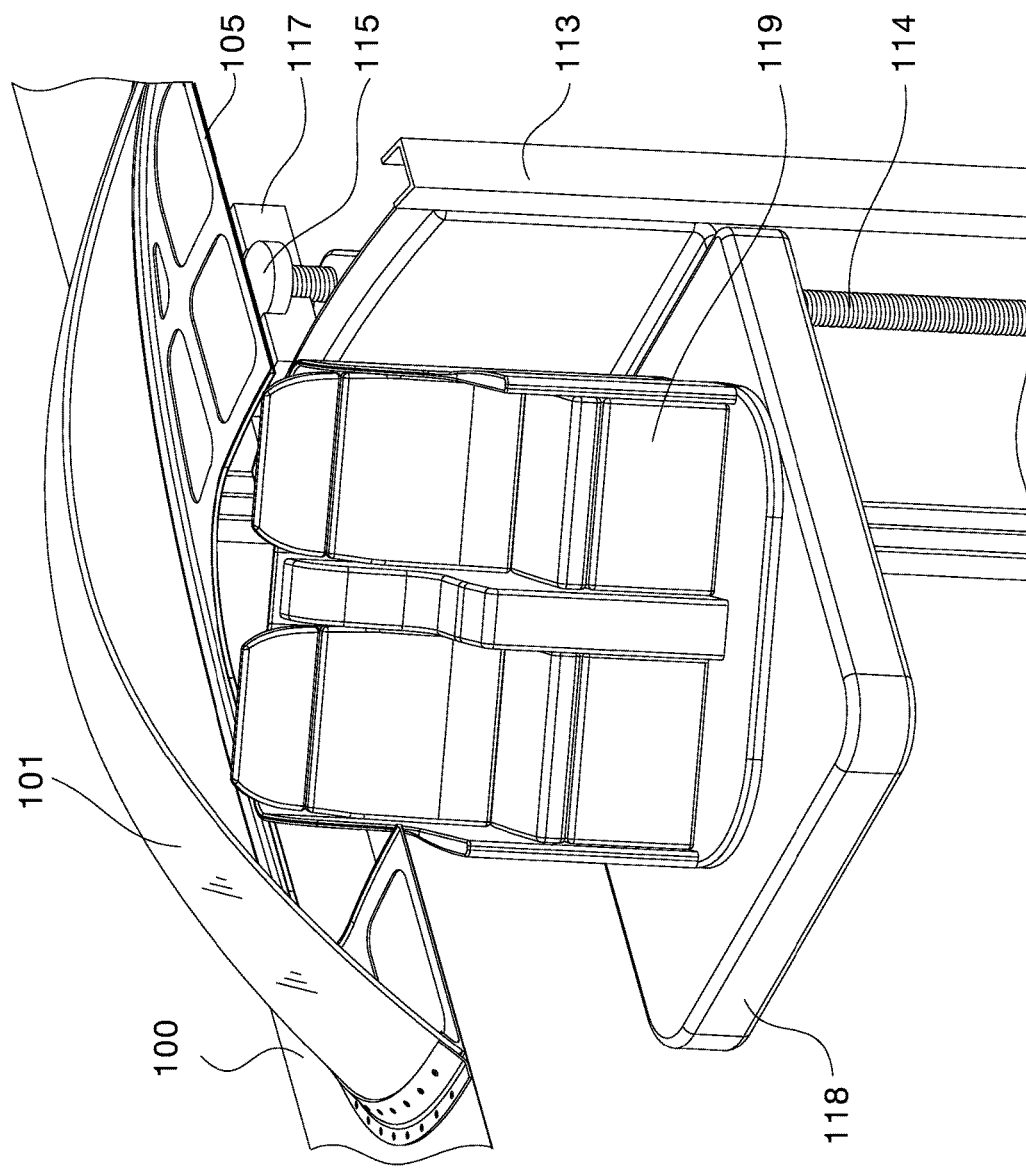
FIG. 15 is an isometric view of the elevating platform of FIG. 13 with the pedestal shown in a second rotated position, according to one embodiment.

In the illustrated embodiment of FIG. 15, the viewing platform 118 is shown in a second position rotated from the first position thereof, illustrated in FIG. 13.

In various embodiments, an observation system or viewing platform or deck, can be configured to accommodate various aircraft types and configurations, and embodiments of the present disclosure are not limited to any particular aircraft type or to the described examples. For example, in some embodiments, an observation system can be installed in a single deck aircraft, and in some embodiments, an observation system can be installed in a multi-deck aircraft, such as a double deck aircraft. Furthermore, in some embodiments, the observation system can be configured to accommodate a single seat or multiple seats viewing platform system.

Furthermore, although certain embodiments may include a movable viewing platform as described above, not all embodiments are limited to being mobile. For example, in some embodiments, an observation system may include a platform system positioned to support passenger viewing seats in or proximate to the viewing position. In some aspects, the platform system can include a fixed viewing platform configured to mount single or multiple seats.

Figure 16:
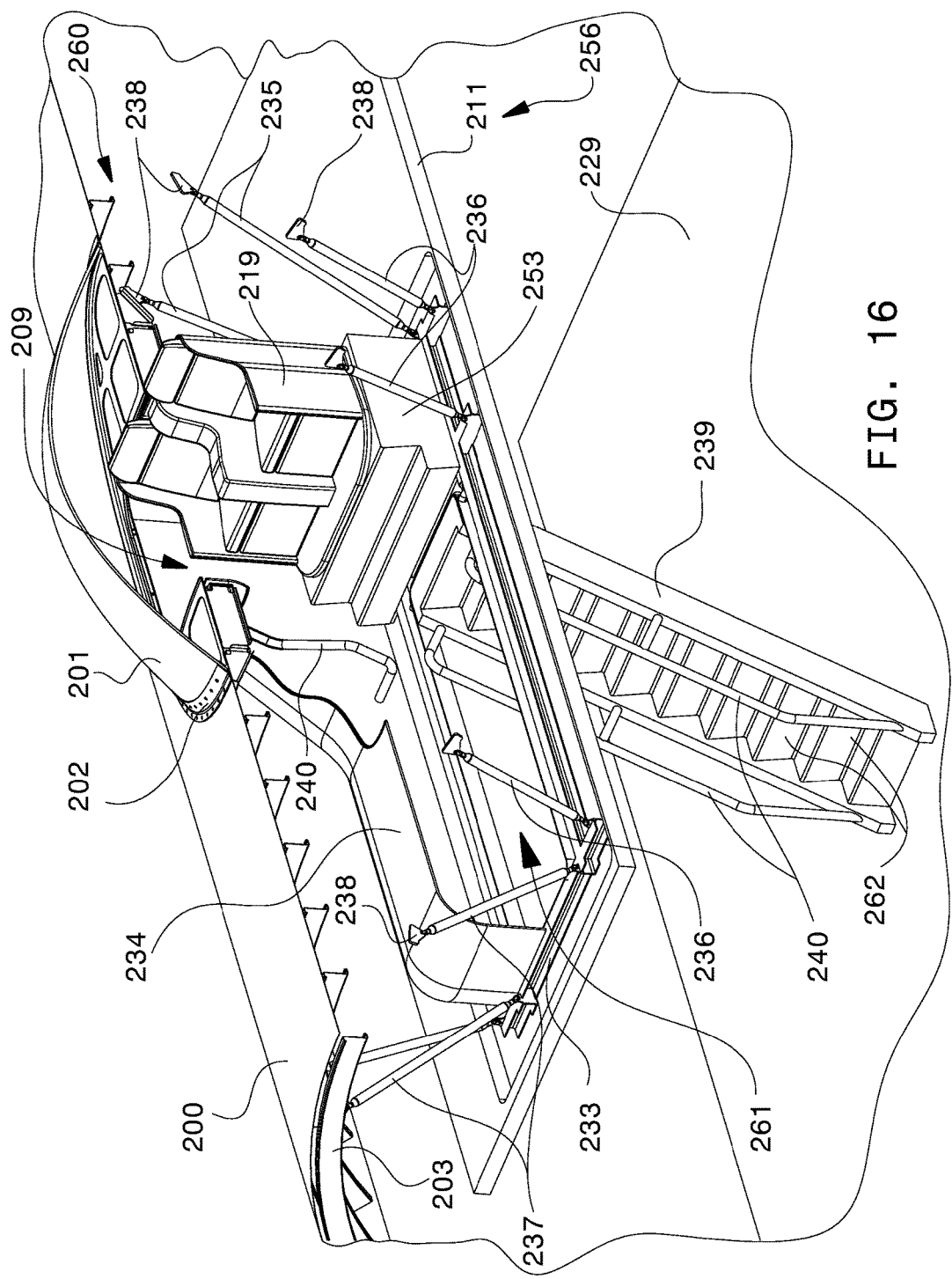
FIG. 16 is an isometric partially cutaway view of an observation deck according to another embodiment having a platform system, a fuselage coupling structure such as tie-rod supports, all positioned relative to a main deck of an aircraft, and a staircase in a first lowered position, according to one embodiment.

In the illustrated embodiment of FIG. 16 for example, an observation system 260 for an aircraft fuselage 200 includes a platform system 256, which can in turn include a viewing platform 253 configured to mount seats 219 in the viewing position adjacent and/or with respect to the canopy and/or transparent cover or dome 201.

In the illustrated embodiment, the fuselage 200 can include a cutout or opening 209. In one aspect, the cutout 209 allows for passengers to view the external environment. The cutout 209 can include any suitable shape or outline, for example, a generally rectangular shape with curved corners, circular, and/or elliptical shape Other shapes and features are possible and within the scope of this disclosure.

In smaller aircraft in which the height of the viewing platform and seats together are sufficient to reach the viewing position from the floor of the fuselage, the viewing platform 219 can be configured to mount or be coupled, directly or indirectly, to the fuselage floor.

In larger aircraft, having large fuselage diameters, the platform system 256 can include the viewing platform 253, a support platform 211, which for example can include a divider, a floor, a ceiling, a panel, and/or a base member to support the seats in the viewing position, and/or any combination thereof. In some aspects, the platform system 256 can include a staircase system 239, which in some embodiments can be pivotably coupled to, or with respect to, the support platform 211.

According to one embodiment, the staircase system 239 can be hinged and/or pivotably coupled to at least a portion of the support platform 211.

For example, in one embodiment, the support platform 211 can include an opening or access region 261. According to one aspect, the staircase system 239 can be pivotably, hingedly, and/or rotatably coupled to the support platform 211 toward a peripheral region of the opening 261, for example in a location thereof proximate the viewing platform 253 and/or the seats 219.

In one aspect, the support platform 211 can include a reinforcement frame 233 coupled to the opening 261, for example, toward the periphery thereof.

According to one aspect, the staircase system 239 can be handedly or pivotably coupled to a portion of the reinforcement frame 233.

In one embodiment, the staircase system 239 includes a plurality of stairs 262 and handrails 240 coupled to the stairs 262. In one aspect, the handrails or a portion thereof can be coupled to the upper ceiling panel or fairing 234 structure, for example a vertical side of upper ceiling panel or fairing 234 for passenger safety.

Figure 17:
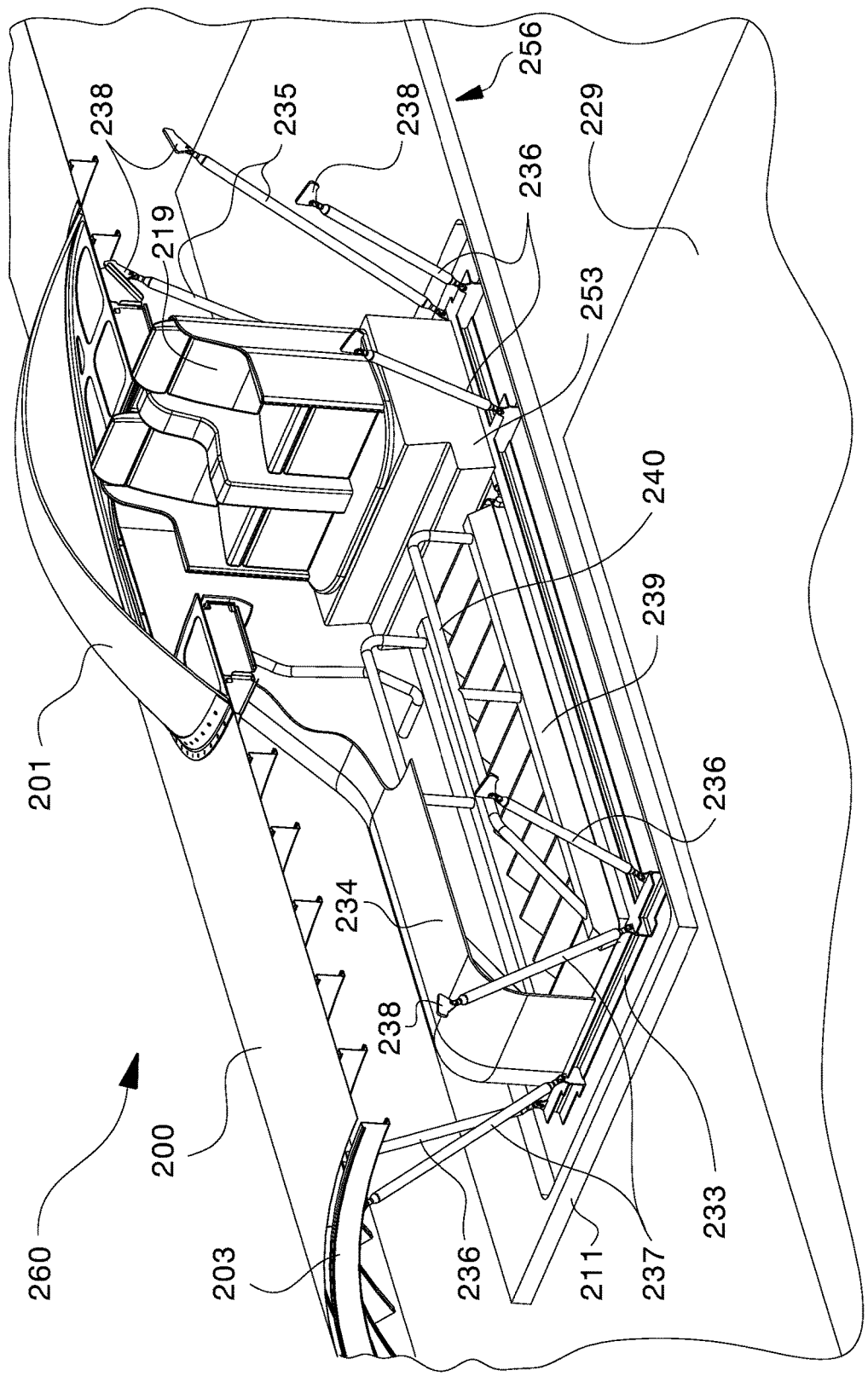
FIG. 17 is an isometric view of the fixed platform system of FIG. 16 with the staircase shown in a second stowed position, according to one embodiment.

In some embodiments, the staircase system 239 can be configured and/or operated to move between a first extended position according to one embodiment illustrated in FIG. 16 and a second stowed position according to one embodiment illustrated in FIG. 17.

In one aspect, in the second stowed position illustrated in FIG. 17, the staircase system 239 can be stowed, for example, in and/or adjacent to the support platform 211 when not in use. In one embodiment, the platform 253 can be coupled and/or mounted to the reinforcement frame 233. In one embodiment, the platform system 256 includes a plurality of suspension elements 235, 236, 237 configured to mount, couple, and/or suspend, or support, the support platform 211 with respect to the fuselage 200.

For example, the suspension elements 235, 236, 237 can include a plurality of tie-rods, for example, aft tie-rods 235 coupling the support platform 211 to the fuselage 200 toward an aft end of the support platform 211, and forward tie-rods 237 coupling the support platform 211 to the fuselage 200 toward a forward end of the support platform 211.

In one embodiment, the reinforcement frame 233 can be supported by side tie-rods 236, forward tie rods 237 and aft tie-rods 235, some or all of which in one aspect can include 9G tie-rods. In one aspect, these tie-rods can be mounted or coupled, directly or indirectly, to the aircraft fuselage structure 200, such as for example, aircraft frames 203 and aircraft stringers via coupling structure such as intercostals 238. In FIG. 16, the staircase system 239 is illustrated in a first deployed position. The tie-rods 235, 236, 237 can be configured to rotate toward their opposing ends, about one or more axes. For example, for rotation about one axis these tie rods 235, 236, 237 can be coupled in a manner such as a bracket and pin combination, or for rotation about more than one axis via a ball and socket connection, or the like.

FIG. 17 illustrates the staircase system 239 in a second stowed position. Movement of the staircase system 239 between the first and second positions can be effected via a manual and/or automatic or automated or partially automated actuating system.

Figure 18:
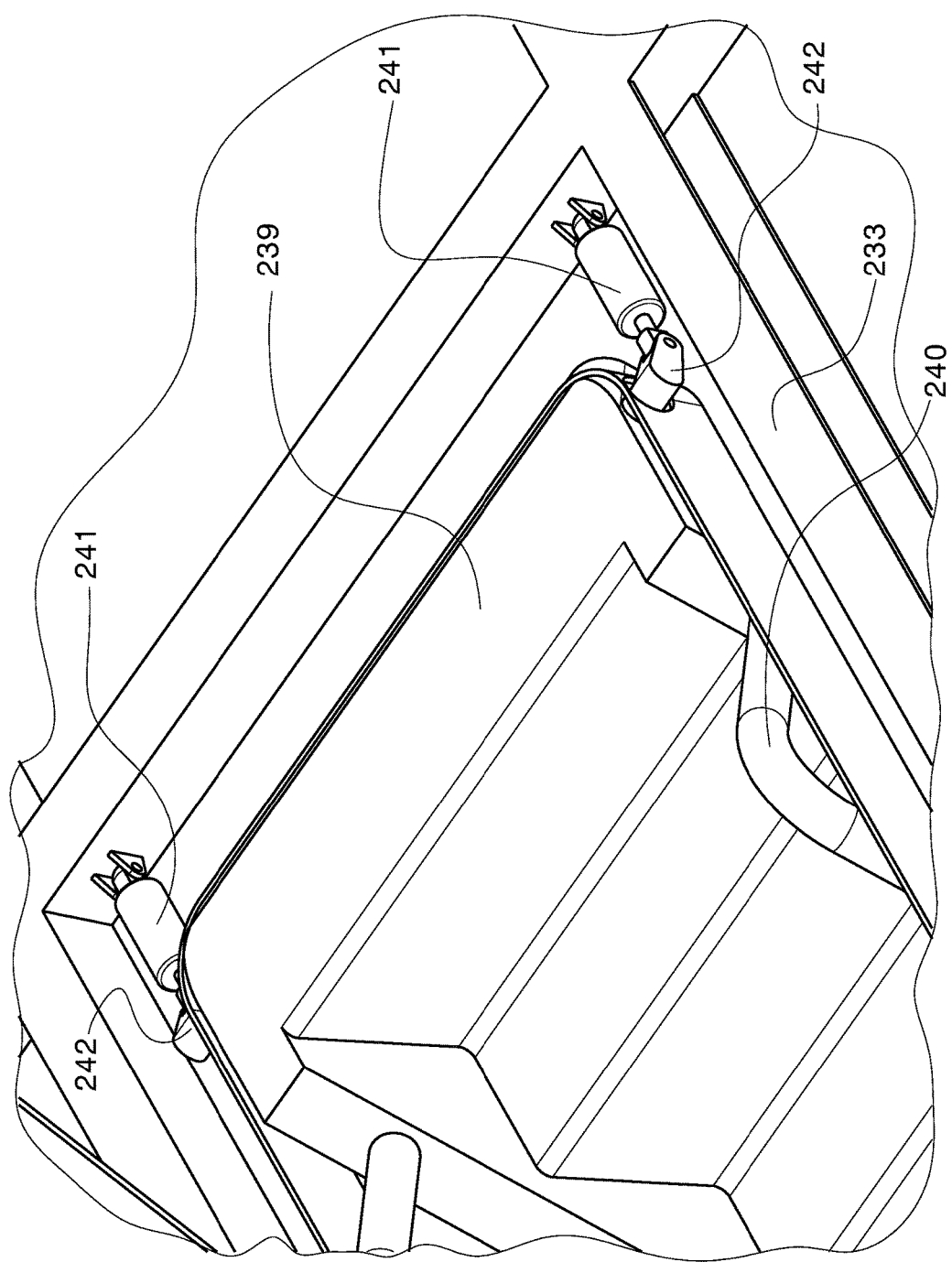
FIG. 18 is an isometric partially cutaway view of a portion of the staircase of FIGS. 16 and 17 coupled to a framed ceiling support structure, dampening actuators, and staircase actuation lever, according to one embodiment.

FIG. 18 for example illustrates one embodiment in which the staircase system 239 includes actuators and/or biasing or dampening devices 241 configured to be coupled to the staircase system 239, or a portion thereof, and to the reinforcement frame 233. In one embodiment, the actuators 241 can include a dampening feature such as, but not limited to, at least one gas spring, an electromechanical actuator, for example, a linear electromechanical actuator, a dampener, any combination thereof, and/or any other suitable biasing, dampening, and/or actuating device or apparatus. For clarity of description and illustration, the actuators 241 will be referred to actuator 241, without any intention to limit the scope of the present disclosure or the actuator type.

In one embodiment, the actuator 241 can be coupled to the staircase system 239 via one or more actuation levers 242. This system of actuator 241 and staircase actuation levers 242 are configured to assist in the deployment and retraction of the staircase system 239 between the first and second positions.

In one embodiment, when in the second stowed position, the staircase system 239 can be locked in position by means of a locking mechanism such as an uplock system mounted and/or coupled to the support platform 211. In one embodiment, to initiate deployment, the lock can be released allowing the staircase 239 to be gently lowered with the help of the actuators 241 and actuation levers 242. In one aspect, the lower end of the staircase is secured to the main deck 229 via a locking mechanism mounted to the main deck 229 floor structure. In one embodiment, to initiate stowing of the staircase 239 from its first deployed position to its second stowed position, the lock holding the staircase 239 to the main deck floor 229 can be released. In one aspect, the staircase 239 then can be manually lifted or actuated via a handle coupled to the staircase 239. Therefore, the weight of the staircase 239 is relieved or mitigated by the action of the actuators 241, allowing the staircase system 239 to be stowed in the second position with little physical effort.

In other embodiments, the staircase 239 can be automatically deployed in the first position and stowed in the second position by means of electric motors and can be combined with gas springs 241 and electrically operated locking mechanisms.

In the deployed position, passengers can climb the staircase system 239 to reach the seats 219 and comfortably observe the environment external with respect to the aircraft through the canopy 201.

Various embodiments of the present disclosure can include features and/or components to seal and support the canopy 201, and make up for the lost structural capability resulting from cutting through the fuselage 200 the opening 209, therefore, allowing use of the observation system 260 in a pressurized aircraft or vessel.

Figure 19:
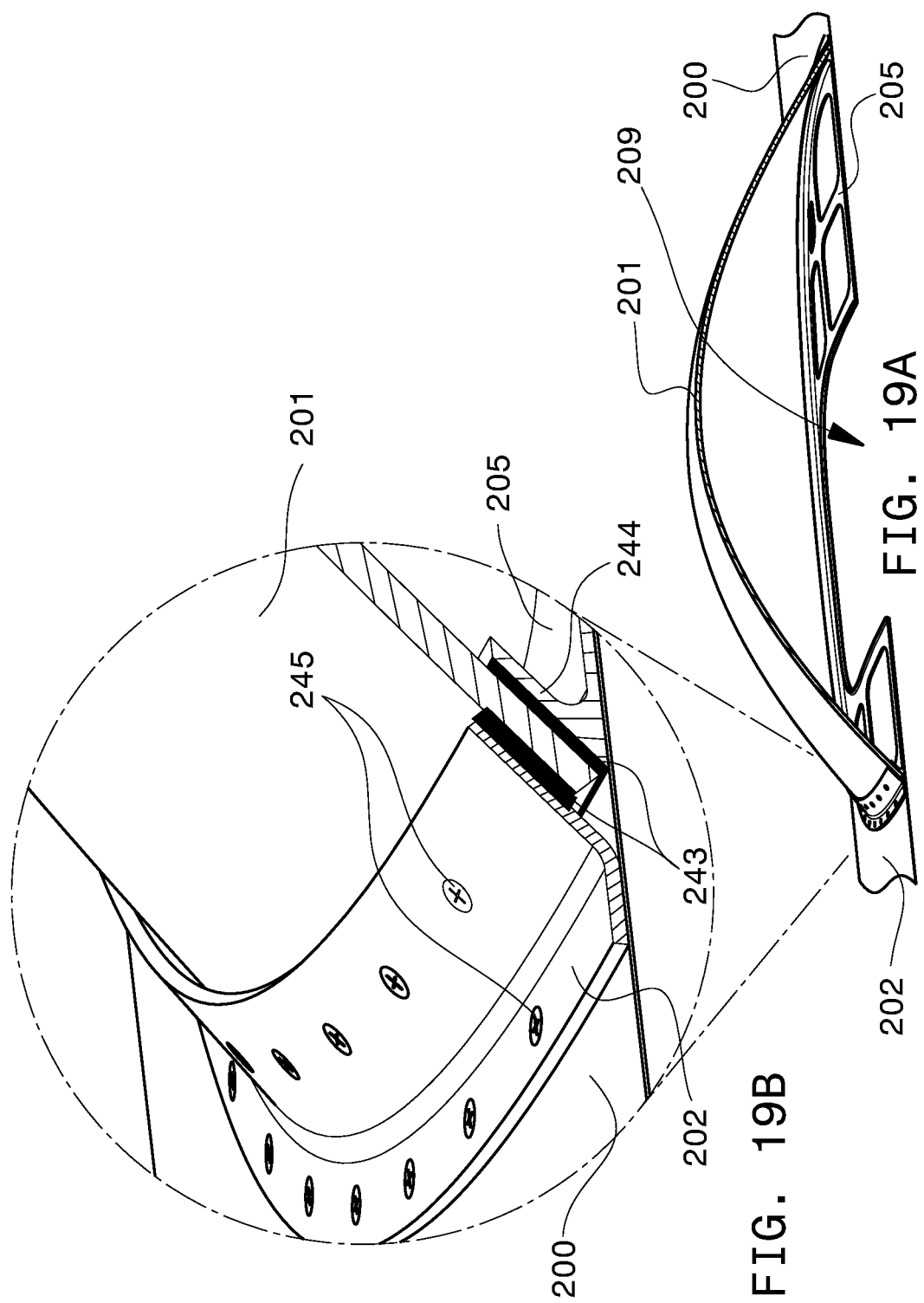
FIG. 19A is a cut-away view of a pressure seal of the canopy of the observation deck of FIG. 16, according to one embodiment.
FIG. 19B is an isometric close up view of a portion of FIG. 19A, illustrating coupling of the canopy to the fuselage, including an inner machined canopy support flange or adapter plate that can be integrated, inner and outer pressure seals, and canopy outer support flange and attachments, according to one embodiment.

For example, FIG. 19A and FIG. 19B illustrates one embodiment in which the canopy 201 includes a reinforcement plate or adaptor 205, one or more canopy pressure seals 243, canopy outer support flange 202, and canopy inner support flange 244. The inner support flange 244 shown in one embodiment can be machined integral to the machined reinforcement plate 205. In other embodiments, the support flange and reinforcement plate can be fabricated from distinct raw material and coupled or secured together using fasteners, adhesive, a combination thereof, and/or any other suitable coupling structure, component, and/or material.

In one embodiment, the inner support flange 244 can include two legs forming an acute angle with respect to one another. In one embodiment, the outer support flange 202 can include two legs forming an obtuse angle with one another. These two angles together provide support and sealing combination, which also facilitates an aerodynamic leading or front angle for the canopy 201, and combine to support the canopy 201 in a pressurized environment, sharing resistance to pressure loads on the canopy 201. The body of the adaptor plate 205 extends about and around the opening 209 to route loads away from the opening 209 and into surrounding fuselage 200 structure. The adaptor plate 205 can in one aspect include openings therein to save on weight.

In some embodiments in which the canopy 201 is of a load bearing nature, the combination of the canopy 201, reinforcement plate 205, inner support flange 244, and outer support flange 202 could actually aid redistribution of loads about the cutout 209.

The canopy 201 assembly can in one embodiment be held together or coupled to the outer support flange 202 by at least one row of fasteners 245 around a perimeter of the canopy 201, and to the aircraft fuselage structure 200. The shape of the canopy seals 243 and inner flange 244 and outer flange 202 can vary in different embodiments. Besides other load conditions, the canopy 201, canopy seals 243, inner flange 244, outer flange 202, and canopy fasteners 245 can be designed in some embodiments to withstand the aircraft internal pressure, flight loads, and bird strike loads, and/or any other load conditions required to be met by relevant aviation authorities.

In some embodiments, a distance between a highest or inflection point of the canopy 201 curvilinear cross section to a front most point of the canopy 201 can be smaller than a distance between the inflection point and the rear most point of the canopy 201, to improve aerodynamic attributes of the canopy 201 and mitigate any drag.

Other observation systems suiting various size aircraft and/or utilizing various motion and platform mechanisms are contemplated to be within the scope of the present disclosure.

Figure 20:
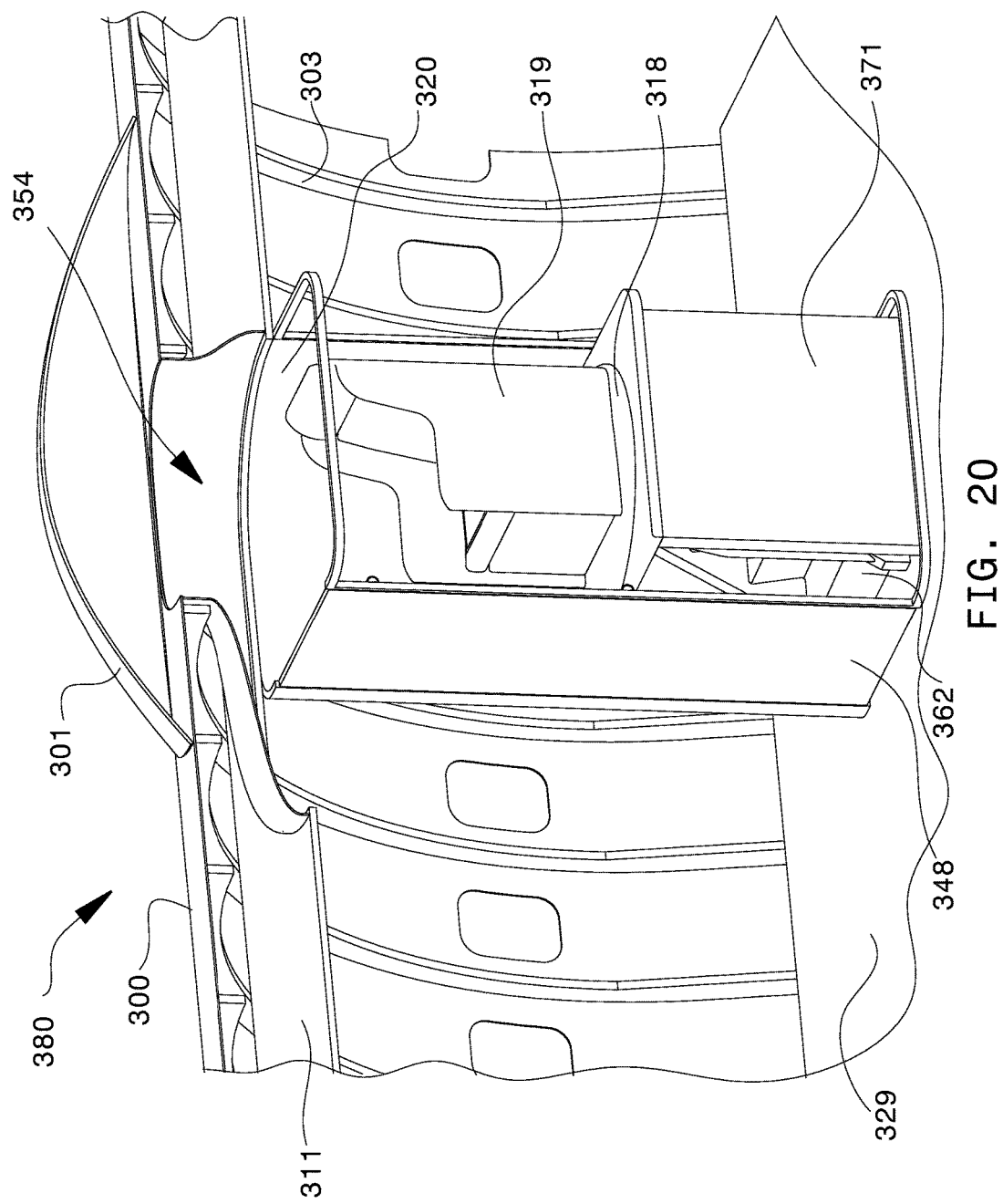
FIG. 20 is an isometric cutaway view of a portion of an aircraft fuselage including an observation system having a canopy, a viewing platform in a first retracted state, and a fuselage cutout according to another embodiment.
Figure 21:
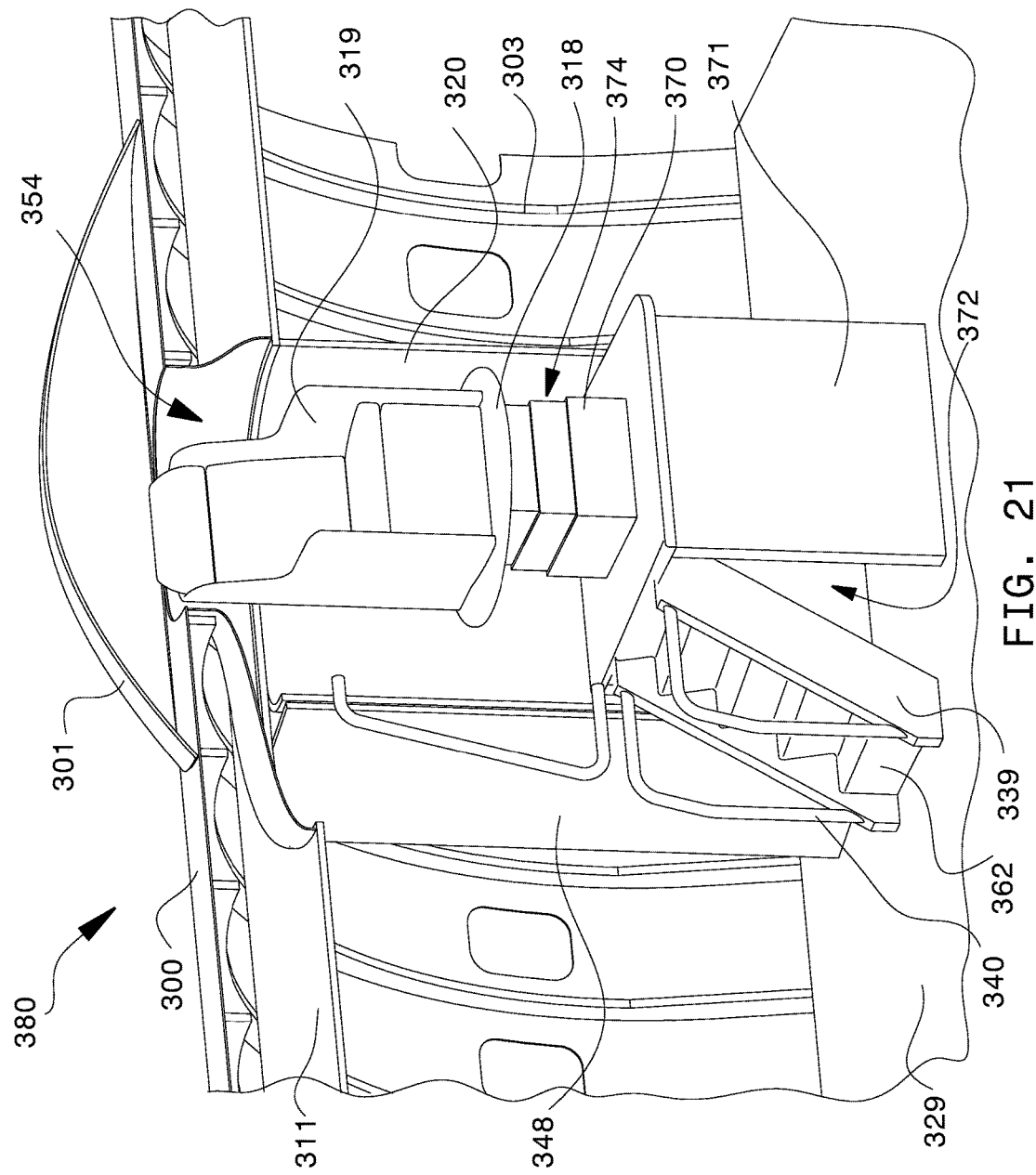
FIG. 21 is an isometric view of the observation system of FIG. 20 with the viewing platform in a second at least partially extended state according to one aspect.

For example, FIGS. 20 and 21 illustrate an observation system 380 coupled to or installed in an aircraft fuselage 300 according to one embodiment. In the illustrated embodiment of FIG. 20, the observation system is shown to be installed in a single aisle or narrow-body aircraft such as a Boeing 737/757, an Airbus A319/A320/A321, Gulfstream G4/G6, Bombardier Global 5000/6000/7000/8000, and/or any other suitable aircraft. It is understood such an embodiment can be scaled or be used with other elevating mechanism and/or access structure for incorporation in a wide-body or twin aisle aircraft such as the Boeing 767/777/787/747 and/or Airbus A350/A380, or the like. Therefore, the specific descriptions related to FIGS. 20 and 21 are provided as example embodiments and not intended to limit the scope of the present disclosure to a particular aircraft type, however, it may better suit certain types.

In one embodiment, the observation system 380 includes a canopy 301 and a platform 318. In one embodiment, the platform 318 is configured to safely and comfortably seat at least one passenger in the aircraft interior to enable the passenger enjoy the external view of the aircraft, for example, while the aircraft is in flight.

FIGS. 20 and 21 illustrate at least one possible location of the canopy 301 relative to the aircraft fuselage structure 300, according to one embodiment. Other suitable aircraft locations to install or mount an observation deck according to an embodiment of this disclosure are contemplated to fall within the scope of the present disclosure.

In one embodiment, the observation system 380 includes a platform support structure 371, which can be coupled to, or with respect to, the fuselage structure 300, such as a floor structure thereof. In one aspect, the support structure 371 can include an actuating and/or elevating mechanism 370. For example, in one embodiment, the elevating mechanism 370 can include a telescoping mechanism. For clarity of description and without any intention to limit the scope of the present disclosure, the elevating mechanism 370 will be referred to as telescoping mechanism 370.

In the illustrated embodiment of FIGS. 20 and 21, the cutout 354 in fuselage 300 allows for passengers positioned in a seat 319 to view the external environment. The cutout 354 can include any suitable shape, periphery, or outline; for example, a generally rectangular shape with curved corners, circular shape, elliptical shape, and/or any other suitable shape or periphery.

According to one embodiment, the observation system 360 includes an access structure such as a ladder and/or staircase 362, which in one aspect can be stowed, for example, when the system 380 is not in use. In one aspect, the platform support structure 371 can include a housing or volume 372 configured or adapted to receive or stow the staircase 362, which in turn can be rollably or slidably coupled to, or with respect to, the platform support structure 371, to move between a stowed position illustrated in FIG. 20 and an extended position illustrated in FIG. 21. The staircase 362 can include a handrail 340 and a staircase frame 339.

The user can climb the staircase 362 to reach the platform 318 and be seated in the seat 319. In one aspect, the telescoping mechanism 370 can be actuated to elevate the seat 319 so the seat and/or the user can protrude through the cutout 354. The telescoping mechanism 370 can in various embodiments incorporate any suitable actuation mechanism, such as pneumatic, hydraulic, electric, motor, jackscrew, manual jacking, any combination thereof, or other suitable actuation mechanism.

The user can rotate or control the seat 319 position using controls similar to those described with respect to above embodiments, saved here for purposes of brevity.

In one aspect, the observation system 380 can include a reinforcing element similar to those described with respect to other embodiments, such as the one illustrated in FIG. 4. According to one aspect, the reinforcing element can include a machined reinforcement plate. In one embodiment, the reinforcing element is coupled to one or more members making up the aircraft fuselage 300 structure, such as frames 303, stringers, and/or intercostals of the fuselage 300. In one aspect, the canopy 301 can include an outer flange positioned toward an end of the canopy 301 and extending therefrom relative to the canopy 301. In one aspect the outer flange can be configured to be positioned adjacent or contiguous to the reinforcing element, similar to the canopy 101 and reinforcing element 105 described above with respect to FIG. 4. For brevity and clarity of illustration these specific features are not show in detail in FIGS. 20 and 21; however, it is understood that the same or similar structures and interfaces can be incorporated in this embodiment.

The system 380 can in some embodiments include an enclosure to cover the system 380 for example when not in operation. For example, the enclosure can include a body 320 and a door 348 pivotably or hingedly coupled to the body 320. The door is shown in an open position in FIG. 21, and a closed position in FIG. 20. In some embodiments, the system 380 or fuselage 300 can include a ceiling structure 311, which can include an opening to facilitate operation of the system 380.

In the illustrated embodiment of FIGS. 20 and 21, the platform 318, the platform structure 371, and telescoping mechanism 370 can be components of a platform assembly 374, in which they can be removably or fixedly coupled to one another. The platform assembly 374 is illustrated in FIG. 21 with a generally square or rectangular outer periphery. It is understood the platform assembly 374 is one embodiment, and other embodiments can include other platform assemblies in which less or more components, or components with various shapes can be used. In the illustrated embodiment of FIG. 21, the platform assembly 374 is shown to be symmetrical about the seat 319; in other embodiments, some or all of the platform assembly can be asymmetrical. Other embodiments are contemplated to be within the scope of this disclosure.

Figure 22:
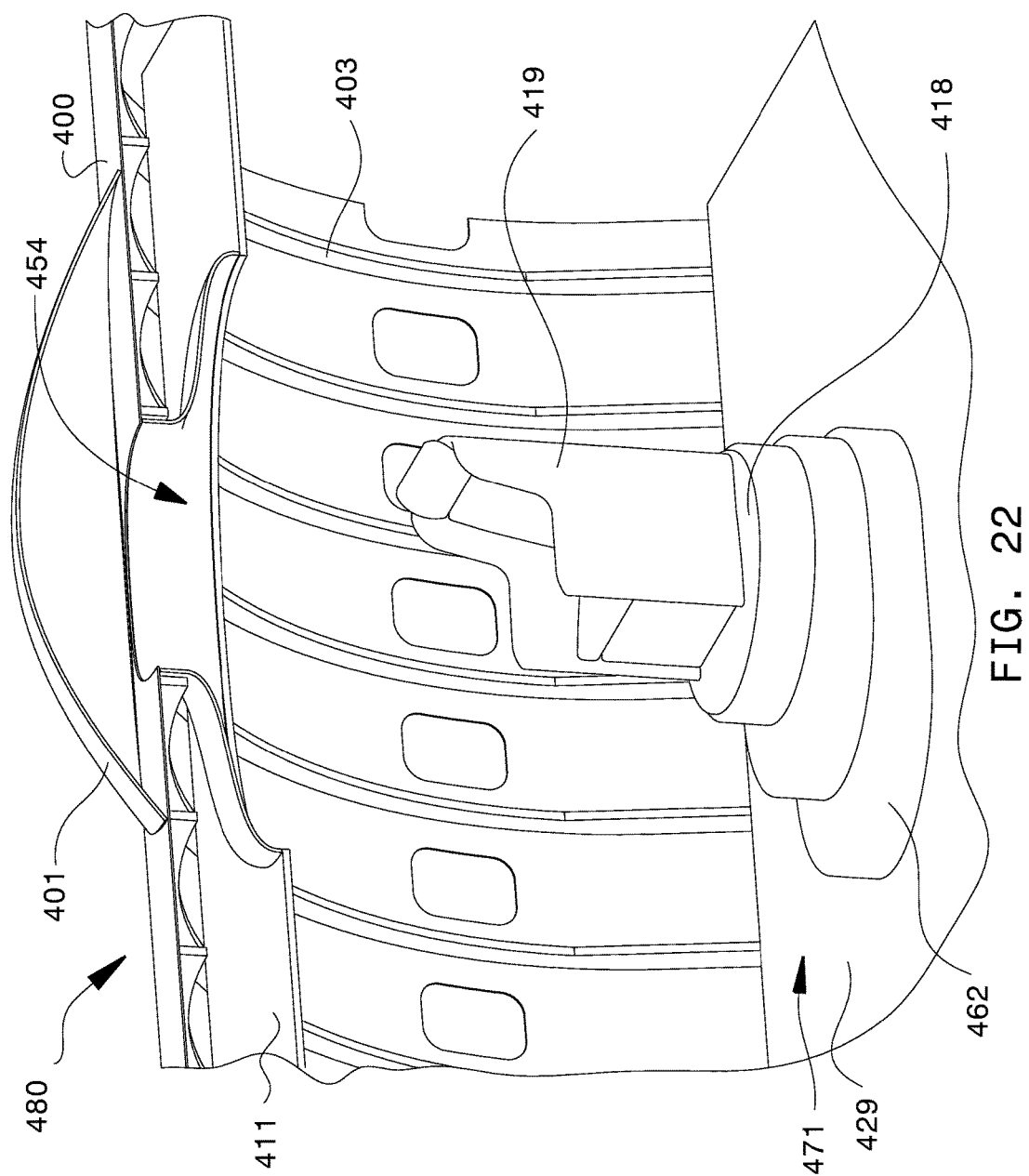
FIG. 22 is an isometric cutaway view of a portion of an aircraft fuselage including an observation system having a canopy, a viewing platform in a first retracted state, and a fuselage cutout according to yet another embodiment.
Figure 23:
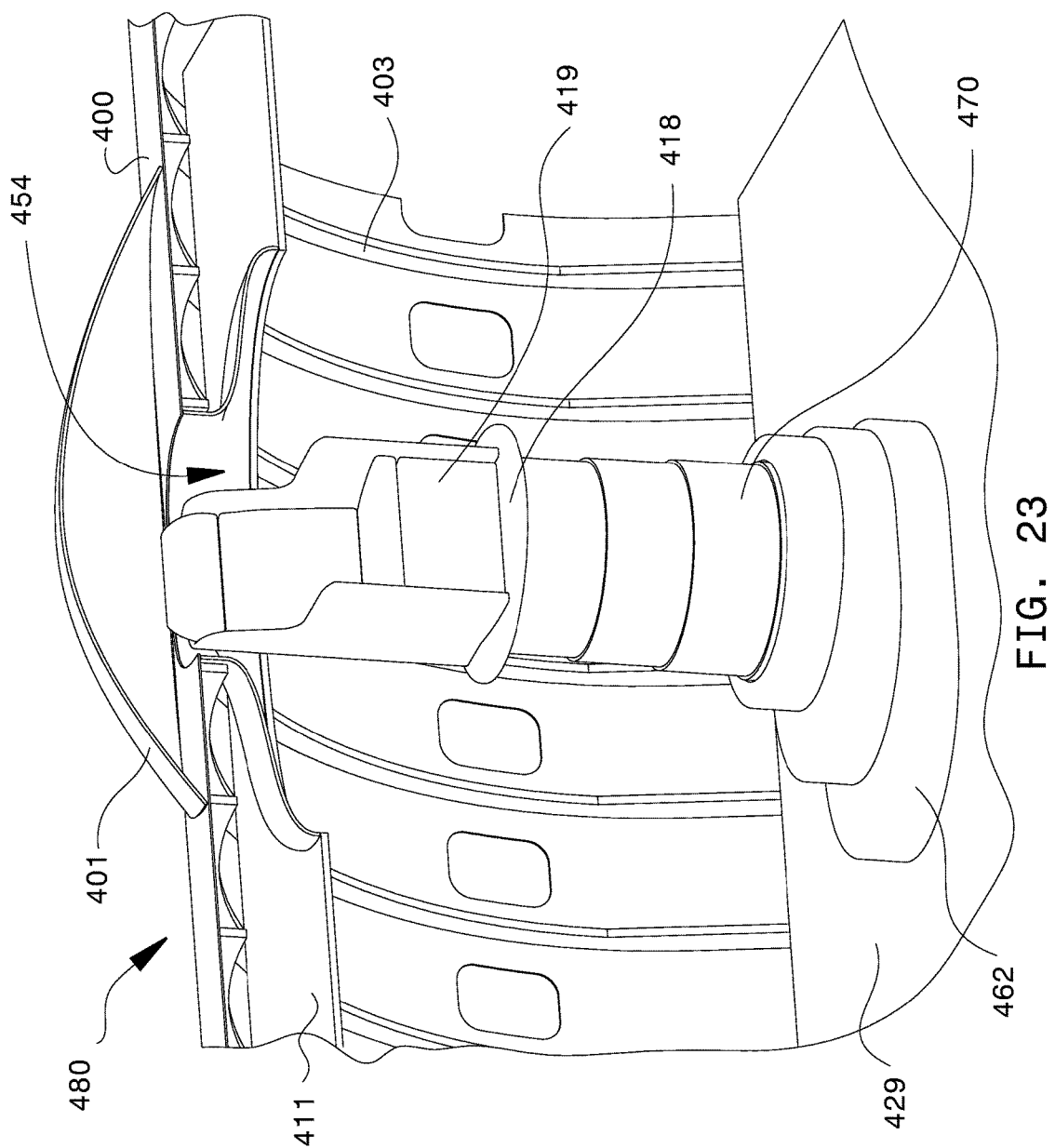
FIG. 23 is an isometric view of the observation system of FIG. 22 with the viewing platform in a second at least partially extended state according to one aspect.

For example, FIGS. 22 and 23 illustrate an observation system 480 according to another embodiment. In the illustrated embodiment of FIG. 22, the observation system is installed in a single aisle or narrow-body aircraft such as a Boeing 737/757, an Airbus A319/A320/A321, Gulfstream G4/G6, Bombardier Global 5000/6000/7000/8000, and/or any other suitable aircraft. It is understood such an embodiment can be scaled or be used with other elevating mechanism and/or access structure for incorporation in a wide-body or twin aisle aircraft such as the Boeing 767/777/787/747 and/or Airbus A350/A380, or the like. Therefore, the specific descriptions related to FIGS. 22 and 23 are provided as example embodiments and not intended to limit the scope of the present disclosure.

In one embodiment, the observation system 480 includes a canopy 401 and a platform 418. In one embodiment, the platform 418 is configured to safely and comfortably seat at least one passenger in the aircraft interior to enable the passenger enjoy the external view of the aircraft, for example, while the aircraft is in flight.

FIGS. 22 and 23 illustrate at least one possible location of the canopy 401 relative to the aircraft fuselage structure 400, according to one embodiment. Other suitable aircraft locations to install or mount an observation deck according to an embodiment of this disclosure are contemplated to fall within the scope of the present disclosure.

In one embodiment, the observation system 480 includes a platform assembly or support structure 471, which can be coupled to, or with respect to, the fuselage structure 400, such as a floor structure thereof.

In one aspect, the platform assembly 471 can include an actuating and/or elevating mechanism 470. For example, in one embodiment, the elevating mechanism 470 can include a telescoping mechanism. For clarity of description and without any intention to limit the scope of the present disclosure, the elevating mechanism 470 will be referred to as telescoping mechanism 470.

In the illustrated embodiment of FIGS. 22 and 23, the cutout 454 allows for passengers positioned in seat 419 to view the external environment. The cutout 454 can include any suitable shape, periphery, or outline; for example, a generally rectangular shape with curved corners, circular shape, elliptical shape, and/or any other suitable shape or periphery.

According to one embodiment, the platform assembly 471 includes an access structure such as a ladder and/or staircase 462, which in one aspect can be integrated with the platform assembly 471. In one aspect, the staircase 462 can include a laterally (or fore and aft) telescoping or other movable stairs such that the stairs could be stowed when the platform assembly 471 is not in use or operation.

The user can climb the staircase 462 to reach the platform 418 and be seated in the seat 419. In one aspect, the telescoping mechanism 470 can be actuated to elevate the seat 419 so the seat and/or the user can protrude through the cutout 454. The telescoping mechanism 470 can in various embodiments incorporate any suitable actuation mechanism, such as pneumatic, hydraulic, electric, motor, jackscrew, manual jacking, any combination thereof, or other suitable actuation mechanism.

The telescoping mechanism 470 can include two or more nesting support structures, which nest within one another when the telescoping. The user can rotate or control the seat 419 position using controls similar to those described with respect to above embodiments, saved here for purposes of brevity. In one aspect, the observation system 460 can include a reinforcing element similar to those described with respect to other embodiments, such as the one illustrated in FIG. 4. According to one aspect, the reinforcing element can include a machined reinforcement plate. In one embodiment, the reinforcing element is coupled to one or more members making up the aircraft fuselage 400 structure, such as frames 403, stringers, and/or intercostals of the fuselage 400. In one aspect, the canopy 401 can include an outer flange positioned toward an end of the canopy 401 and extending therefrom relative to the canopy 401. In one aspect the outer flange can be configured to be positioned adjacent or contiguous to the reinforcing element, similar to the canopy 101 and reinforcing element 105 described above with respect to FIG. 4. For brevity and clarity of illustration these specific features are not show in detail in FIGS. 22 and 23; however, it is understood that the same or similar structures and interfaces can be incorporated in this embodiment.

Therefore, at least certain embodiments of the present disclosure, whether described or not described, allow aircraft passengers to safely protrude outside of the fuselage of the aircraft while in flight and enjoy the surrounding view in a substantially or partially panoramic manner.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of facilitating viewing an environment external to a fuselage of an aircraft having a floor deck and configured to fly in a cruise phase at an altitude in flight, the method comprising:
   rotatably mounting at least one seat adapted to seat a passenger on a platform assembly including a platform configured to mount at least one seat adapted to seat a passenger;
   forming a canopy volume by coupling a canopy to the fuselage, extending the canopy beyond the fuselage when coupled thereto; and
   coupling an elevating system to the platform, configuring the elevating system to be operable to facilitate positioning the passenger between a first position located proximate the floor deck of the fuselage and a second position in which the passenger is at least partially positioned in the canopy volume, the seat being rotatable on the platform at least when in the second position during the cruise phase.

2. The method of claim 1, further comprising:
   positioning a pedestal between the platform and the seat, rotatably coupling the pedestal to the platform and fixedly coupling the pedestal to the seat.

3. The method of claim 1 wherein the step of coupling the elevating system includes coupling at least one jack screw column to the fuselage, and at least one gimbal system to the platform, rotatably coupling the jack screw column to the gimbal system, rotation of the jack screw column imparting axial motion to the gimbal system.

4. The method of claim 1, further comprising:
   coupling a support structure to the fuselage and to the platform; and
   coupling at least one self-retracting electrical cable spool unit to at least one of the fuselage and the support structure, the spool unit having a spool and a cable, and coupling the cable to the spool toward one end thereof, and to the platform assembly toward an opposing end thereof.

5. The method of claim 1 further comprising:
   coupling a support structure to the fuselage and to the platform;
   constructing the support structure from a tower structure including a plurality of support columns and a plurality of truss members respectively having first and second ends;
   rotatably coupling the support columns to the fuselage toward at least one end of each support column to rotate about a first axis; and
   rotatably coupling the first end of the truss members to one of the support columns and rotatably coupling the second of the truss members to a support column adjacent thereto, to rotate about a second axis.

6. The method of claim 5 wherein the first axis is perpendicular to the second axis.

7. The method of claim 1, further comprising:
   coupling a control panel to at least one of the platform assembly and the seat, and operatively coupling the control panel to the elevating system to facilitate selectable movement of the platform; and
   electronically coupling at least one monitor to the control panel, the monitor adapted to display information.

8. The system of claim 1 wherein the step of coupling the elevating system includes:
   coupling a support structure to the fuselage and to the platform;
   hingedly coupling a staircase to the support structure, and coupling a plurality of actuators and actuation levers to the staircase, the actuators moderating movement of the staircase between a retracted position and an extended position.

9. The system of claim 1 wherein the step of coupling the elevating mechanism includes:
   forming a telescopic mechanism by nesting a plurality of support sections including a base support section and nesting at least one support section in an adjacent support section, and in operation actuating the plurality of support sections between a nested stowed position and a telescoping extended position in which the support sections extend from their respective nested positions.

10. A method of manufacturing an aircraft comprising:
    installing a floor deck in a fuselage;
    forming an observation opening in the fuselage;
    coupling a canopy assembly having a canopy to the fuselage, extending the canopy beyond the fuselage, forming a canopy volume;
    rotatably mounting a seat configured to seat a passenger on a platform assembly having a platform; and
    coupling an elevating system to the platform operable to facilitate positioning the seat between a first position located proximate the floor deck of the fuselage and a second position in which the passenger is at least partially positioned in the canopy volume.

11. The method of claim 10 wherein the coupling the elevating system includes at least one gimbal system to a jack screw column and to the platform assembly, wherein in operation, rotation of the jack screw column in the gimbal system facilitates movement of the platform assembly and seat between the upper and lower positions.

12. The method of claim 11, further comprising:
coupling a support structure to the fuselage, coupling the support structure to the platform wherein the step of coupling the support structure includes:
coupling to the fuselage a tower structure including a plurality of support columns and a plurality of truss members respectively having first and second ends;
rotatably coupling the tower structure to the fuselage toward at least one end of each support column; and
rotatably coupling the first end of the truss members to one of the support columns and rotatably coupling the second end of the truss members to another one of the support columns.

13. The method of claim 12 wherein the coupling of the at least one end of each support column includes rotatably coupling the at least one end to rotate about a first axis, and rotatably coupling the first and second ends of the truss members includes rotatable coupling about a second axis perpendicular to the first axis.

14. The method of claim 10, further comprising:
positioning a control panel with respect to the seat to allow the passenger in the seat to manipulate the control panel, electronically and operatively coupling the control panel to the elevating system; and
operatively coupling to the control panel, a display monitor viewable from the seat and configured to display information.

15. The aircraft of claim 10 wherein coupling the elevating system includes:
pivotably coupling a staircase assembly to the platform assembly, and
coupling at least one actuator to the staircase assembly and the platform, configuring the actuator to dampen motion of the staircase between a first lowered position and a second stowed position.

16. An aircraft observation system adapted to be installed to a fuselage of an aircraft, the system comprising:
a canopy extending beyond the fuselage and forming a canopy volume;
a platform assembly having a platform and at least one seat rotatably coupled to the platform and adapted to seat a passenger; and
an elevating system coupled to the support structure and to the platform assembly, the elevating system configured to facilitate positioning the passenger between a first position located proximate the floor deck of the fuselage and a second position in which the passenger is at least partially positioned in the canopy volume, the seat being rotatable on the platform at least when in the second position during the cruise phase.

* * * * *